United States Patent
Roche

(10) Patent No.: US 11,243,651 B2
(45) Date of Patent: *Feb. 8, 2022

(54) GUIDED OPERATION OF A LANGUAGE DEVICE BASED ON CONSTRUCTED, TIME-DEPENDENT DATA STRUCTURES

(71) Applicant: GammaKite, Inc., Belmont, MA (US)

(72) Inventor: Emmanuel Roche, Belmont, MA (US)

(73) Assignee: GAMMAKITE, INC., Belmont, MA (US)

( * ) Notice: Subject to any disclaimer, the term of this patent is extended or adjusted under 35 U.S.C. 154(b) by 358 days.

This patent is subject to a terminal disclaimer.

(21) Appl. No.: 16/260,591

(22) Filed: Jan. 29, 2019

(65) Prior Publication Data
US 2019/0155457 A1 May 23, 2019

Related U.S. Application Data

(63) Continuation of application No. 15/209,495, filed on Jul. 13, 2016, now Pat. No. 10,235,007, which is a continuation of application No. 14/719,176, filed on May 21, 2015, now abandoned.

(51) Int. Cl.
| | |
|---|---|
| *G09B 19/06* | (2006.01) |
| *G09B 5/04* | (2006.01) |
| *G09B 19/08* | (2006.01) |
| *G06F 3/0481* | (2013.01) |
| *G09B 23/28* | (2006.01) |
| *G09B 23/30* | (2006.01) |
| *G09B 19/04* | (2006.01) |

(52) U.S. Cl.
CPC .......... *G06F 3/0481* (2013.01); *G09B 5/04* (2013.01); *G09B 19/06* (2013.01); *G09B 23/283* (2013.01); *G09B 23/30* (2013.01); *G09B 19/04* (2013.01); *G09B 19/08* (2013.01)

(58) Field of Classification Search
CPC .................. G09B 5/04; G09B 19/06
See application file for complete search history.

(56) References Cited

U.S. PATENT DOCUMENTS

| | | |
|---|---|---|
| 5,142,657 A | 8/1992 | Ezawa et al. |
| 5,932,123 A | 8/1999 | Marhofer et al. |
| 6,077,085 A | 6/2000 | Party et al. |

(Continued)

OTHER PUBLICATIONS

U.S. Appl. No. 15/209,495, filed Jul. 13, 2016, Roche.
(Continued)

*Primary Examiner* — Robert J Utama
(74) *Attorney, Agent, or Firm* — Smith Baluch LLP

(57) ABSTRACT

A personal electronic device is adapted to construct data tables from user input received over time relating to translations of translatable items from a first language to a second language. Entries in a data table for a user are dynamic and may indicate likelihoods of the user correctly translating translatable items as a function of time. Each translatable item may have a different time-dependent likelihood of a correct translation. Operation of the personal electronic device for a user may be based in part on the acquired, time-dependent likelihoods for that user, so that information may be presented to the user in a more efficient manner.

20 Claims, 12 Drawing Sheets

(56) References Cited

U.S. PATENT DOCUMENTS

| | | | |
|---|---|---|---|
| 6,419,496 B1* | 7/2002 | Vaughan, Jr. | G09B 7/02 434/118 |
| 6,652,283 B1 | 11/2003 | Van Schaack et al. | |
| 7,587,306 B2 | 9/2009 | Teytaud | |
| 8,953,034 B1 | 2/2015 | Milosevic et al. | |
| 9,330,575 B2 | 5/2016 | Peters et al. | |
| 9,498,231 B2 | 11/2016 | Haider et al. | |
| 10,235,007 B2 | 3/2019 | Roche | |
| 2002/0150868 A1 | 10/2002 | Yui et al. | |
| 2003/0046057 A1 | 3/2003 | Okunishi et al. | |
| 2003/0203343 A1 | 10/2003 | Milner | |
| 2004/0115597 A1 | 6/2004 | Butt | |
| 2006/0168507 A1 | 7/2006 | Hansen | |
| 2008/0059145 A1 | 3/2008 | Wood et al. | |
| 2008/0077384 A1 | 3/2008 | Agapi et al. | |
| 2008/0169277 A1 | 7/2008 | Achtner et al. | |
| 2008/0293021 A1 | 11/2008 | Jang | |
| 2009/0048821 A1 | 2/2009 | Yam et al. | |
| 2009/0155750 A1 | 6/2009 | Abe | |
| 2009/0191519 A1 | 7/2009 | Wakamoto et al. | |
| 2009/0253113 A1 | 10/2009 | Tuve | |
| 2010/0224610 A1 | 9/2010 | Wallace | |
| 2011/0006047 A1 | 1/2011 | Penrod et al. | |
| 2011/0053124 A1 | 3/2011 | Jung | |
| 2013/0119037 A1 | 5/2013 | Daniel | |
| 2013/0130210 A1 | 5/2013 | Dohring et al. | |
| 2013/0130212 A1 | 5/2013 | Dohring et al. | |
| 2013/0183645 A1 | 7/2013 | Wallace et al. | |
| 2013/0256289 A1 | 10/2013 | Knoener et al. | |
| 2013/0264322 A1 | 10/2013 | Bornemann et al. | |
| 2013/0265416 A1 | 10/2013 | Enyedy et al. | |
| 2014/0039870 A1 | 2/2014 | Roy et al. | |
| 2014/0144898 A1 | 5/2014 | Upton | |
| 2014/0170613 A1 | 6/2014 | Jensson | |
| 2014/0220540 A1 | 8/2014 | Burgin et al. | |
| 2014/0272821 A1 | 9/2014 | Pitschel et al. | |
| 2014/0303956 A1 | 10/2014 | Wilson | |
| 2015/0122781 A1 | 5/2015 | Albrecht | |
| 2015/0248845 A1 | 9/2015 | Postlethwaite et al. | |
| 2015/0328710 A1 | 11/2015 | Kachline | |
| 2015/0375327 A1 | 12/2015 | Becker et al. | |
| 2015/0379894 A1 | 12/2015 | Becker et al. | |
| 2016/0027088 A1 | 1/2016 | Jensen et al. | |
| 2016/0343272 A1 | 11/2016 | Roche | |
| 2018/0158365 A1 | 6/2018 | Roche | |

OTHER PUBLICATIONS

U.S. Appl. No. 15/575,659, filed Nov. 20, 2017, Roche.
PCT/IB2016/000923, Sep. 30, 2016, International Search Report and Written Opinion.
PCT/IB2016/000923, Nov. 30, 2017, International Preliminary Report on Patentability.
International Search Report and Written Opinion for International Application No. PCT/IB2016/000923 dated Sep. 30, 2016.
International Preliminary Report on Patentability for International Application No. PCT/IB2016/000923 dated Nov. 30, 2017.
[No Author Listed], Forgetting curve. Wikipedia. https://en.wikipedia.org/wiki/Forgetting_curve Mar. 22, 2018. 3 pages.

\* cited by examiner

FIG. 4D

Your Statistics 907
☑ Flashcards  ☑ Snakes
905                  910

MyTexts | house compact | Decks | Quiz | [Stats] | Dictionary | Store

Sort by: ⦿ Recently Tested  
⃝ Recently Added  
⃝ Recall

Filter with tags:

All Texts

| Flag | Chinese | Pinyin | English | Date | Success | Prob |
|---|---|---|---|---|---|---|
| * | 理解 | lǐjiě | to comprehend | 5 days | YES | 0% |
| * | 绝大部分 | juédàbùfen | overwhelming majority | 5 days | YES | 3% |
| * | 丢弃 | diūqì | to discard | 5 days | YES | 3% |
| * | 放弃 | fàngqì | to renounce | 5 days | YES | 3% |
| * | 鸿沟 | hónggōu | wide gap | 5 days | YES | 3% |
| * | 勺子 | sháozi | scoop | 6 days | YES | 88% |
| * | 低效 | dīxiào | inefficient | 6 days | YES | 3% |
| * | 通常 | tōngcháng | regular | 6 days | YES | 3% |
| * | 忘掉 | wàngdiào | to forget | 6 days | YES | 73% |
| * | 车库 | chēkù | garage | 6 days | YES | 0% |
| * | 宽敞 | kuānchang | spacious | 6 days | YES | 70% |
| * | 床垫 | chuángdiàn | mattress | 6 days | YES | 78% |
| * | 空调 | kōngtiáo | air conditioning | 7 days | YES | 85% |
| * | 餐厅 | cāntīng | dining hall | 7 days | YES | 74% |
| * | 吊灯 | diàodēng | chandelier | 7 days | YES | 77% |
| * | 毛毯 | máotǎn | blanket | 7 days | YES | 77% |
| * | 吸尘器 | xīchénqì | vacuum cleaner | 7 days | YES | 77% |
| * | 露台 | lùtái | balcony | 7 days | YES | 77% |
| * | 枕头 | zhěntou | pillow | 7 days | YES | 79% |
| * | 马桶 | mǎtǒng | chamber pot | 7 days | YES | 79% |
| * | 卫生纸 | wèishēngzhǐ | toilet paper | 7 days | YES | 79% |
| * | 床单 | chuángdān | bed sheet | 8 days | YES | 71% |

GUIDED OPERATION OF A LANGUAGE DEVICE BASED ON CONSTRUCTED, TIME-DEPENDENT DATA STRUCTURES

RELATED APPLICATION

This application is a continuation of U.S. patent application Ser. No. 15/209,495, filed Jul. 13, 2016, entitled "GUIDED OPERATION OF A LANGUAGE DEVICE BASED ON CONSTRUCTED, TIME-DEPENDENT DATA STRUCTURES, which is a continuation of U.S. patent application Ser. No. 14/719,176, filed May 21, 2015, entitled "ENRICHED LANGUAGE-LEARNING SYSTEM," each of which is hereby incorporated by reference in its entirety.

FIELD

The described apparatus and methods relate to the technological field of computer-implemented, language-learning tools and systems.

BACKGROUND

Traditional methods of learning a foreign language by classroom instruction, textbook study, and study groups have been supplemented, and in some cases replaced, by electronic and computer-aided language-learning programs. Examples of such language-learning programs include tape recordings, CD and DVD recordings, and/or software applications that are available from Rosetta Stone, Inc. of Arlington, Va. or from Simon & Schuster, Inc. of Concord, Mass. marketed under the Pimsleur® trademark. An advantage of electronic language-learning programs (e.g., recordings that may be played on portable devices supporting audio reproduction) and computer-aided language-learning programs (e.g., software that may be used to adapt a general-purpose computer into an instrument for interactive language learning) is that a student may use the tools at times convenient to the student, e.g., listening to an audio recording while driving in the car, studying at a computer during a lunch break. However, a disadvantage of conventional electronic and computer-aided tools is that they do not offer, or offer on a limited scheduling basis, interactive discourse with an instructor or classmate, which can be an effective mode of language learning.

SUMMARY

According to some embodiments, an enriched language-learning system comprises one or more computing devices adapted to communicate over a data communication network. A computing device may be configured to display flashcard and text user-interactive interfaces which are used by a student to study and learn a second language. The system may compile and maintain a detailed "memory model" for each student-user, that closely tracks a student's proficiency in the second language on substantially a word-by-word basis. Memory model data can be processed to affect student-system interactions (e.g., when translatable items are presented to a student, what type of translatable items are presented to a student, whether new text should be presented to a student, when flashcards no longer need to be studied by a student), and to quickly and visually inform the student or an on-line assistance of the student's proficiency for displayed translatable items.

According to some embodiments, methods and related apparatus for enriched language learning include memory-model data structures and related algorithms that are maintained by the system for each student's memory model. The data structures and algorithms represent a time-dependent memory model for each student, and can closely track a student's progress in learning a second language. A student's memory model may comprise a plurality of "memory representations," one for each translatable item and translation aspect that a student has studied, along with additional memory-model data. Data compiled from a student's memory model can be shared directly (e.g., as proficiency values for translatable items) or indirectly (e.g., as color-coded text) with others or presented to the student to instantly convey the student's current comprehension level. By sharing information from a student's memory model, on-line instructional or conversational sessions can be more efficiently tailored to the student's level of comprehension than is possible with conventional language-learning systems or traditional classroom settings. Information from a student's memory model can be used to reduce "comprehension gaps" between an instructor and the student, or between a student's estimated and actual comprehension levels. Other features of the language-learning system include self-directed learning (e.g., studying translation text entered by the student and considered to be important by the student rather than predetermined translation text considered by others to be important for the student).

The present invention includes methods and devices that can improve the efficiency of computer-aided language-learning programs, so that a student learning a second language can achieve greater proficiency in the second language in less time or effort compared to conventional language-learning programs. At least some of the methods may be embodied as machine-readable instructions that can specially adapt at least one computing device to execute enriched language-learning functionality. According to some embodiments, a specially-adapted language-learning device may execute enriched language-learning functionality on-line in a communication network (such as the Internet) or off-line.

According to some embodiments, a system to aid a student who speaks a first language in learning a second language may comprise a first device having a visual display and configured to communicate in a data communications network and at least one data processor configured to communicate with a data storage device. The system may further include machine-readable instructions stored on the data storage device that adapt the at least one data processor to generate, from first data that includes a first translatable item, a user-interactive first dashboard that includes the first translatable item and display the first dashboard on the visual display. The system may further include machine-readable instructions that adapt the at least one data processor to receive a first student input corresponding to a translation of a first translation aspect of the first translatable item at a first time, receive a second student input corresponding to a translation of the first translation aspect of the first translatable item at a second time, and based upon the received first student input and the second student input, compute at least a first memory parameter for a first memory representation for the first translation aspect of the first translatable item for the student, wherein the first memory representation defines a relation between a likelihood of a correct translation for the first translation aspect of the first translatable item and time. The system may further include machine-readable instructions that adapt the at least one data processor to store at least the first memory parameter in a memory-model data structure representative of a memory model for the student, wherein the memory-model data structure includes a plurality of memory parameters for a plurality of translation aspects and translatable items.

Corresponding method implementations are also contemplated. According to some embodiments, a method for aiding a student who speaks a first language in learning a second language may comprise acts carried out at a first device having a visual display and at least one data processor configured to communicate with a data storage device and to communicate in a data communications network. The acts may include generating, from first data that includes a first translatable item, a user-interactive interface that includes the first translatable item, displaying the first user-interactive interface on the visual display, receiving a first student input corresponding to a translation of a first translation aspect of the first translatable item at a first time, and receiving a second student input corresponding to a translation of the first translation aspect of the first translatable item at a second time. Additional acts may include, based upon the received first student input and the second student input, computing at least a first memory parameter for a first memory representation for the first translation aspect of the first translatable item for the student, wherein the first memory representation defines a relation between a likelihood of a correct translation for the first translation aspect of the first translatable item and time, and storing at least the first memory parameter in a memory-model data structure representative of a memory model for the student, wherein the memory-model data structure includes a plurality of memory parameters for a plurality of translation aspects and translatable items.

Embodiments of an enriched language-learning system may further include non-transitory data-storage devices that include machine-readable instructions to adapt the at least one processor to execute acts of enriched language-learning methods.

In some embodiments, enriched language-learning may comprise at least one server operating in a data-communication network. The server may comprise at least one data processor configured to communicate with a data storage device and configured to communicate in a data communications network, and machine-readable instructions stored on the data storage device that adapt the at least one data processor to identify first data for a user-interactive interface that includes a first translatable item, transmit the first data to a first device, receive, from the first device, a first student input corresponding to a translation of a first translation aspect of the first translatable item at a first time, and receive, from the first device, a second student input corresponding to a translation of the first translation aspect of the first translatable item at a second time. The server may further include machine-readable instructions that adapt the at least one data processor to, based upon the received first student input and the second student input, compute at least a first memory parameter for a first memory representation for the first translation aspect of the first translatable item for the student, wherein the first memory representation defines a relation between a likelihood of a correct translation for the first translation aspect of the first translatable item and time, and store at least the first memory parameter in a memory-model data structure representative of a memory model for the student, wherein the memory-model data structure includes a plurality of memory parameters for a plurality of translation aspects and translatable items.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 4D depicts a user-interactive dashboard that includes a flashcard dashboard, according to some embodiments;

FIG. 9 depicts a flashcard summary dashboard, according to some embodiments; and FIG. 10 depicts a deck summary dashboard, according to some embodiments.

Figure 1:
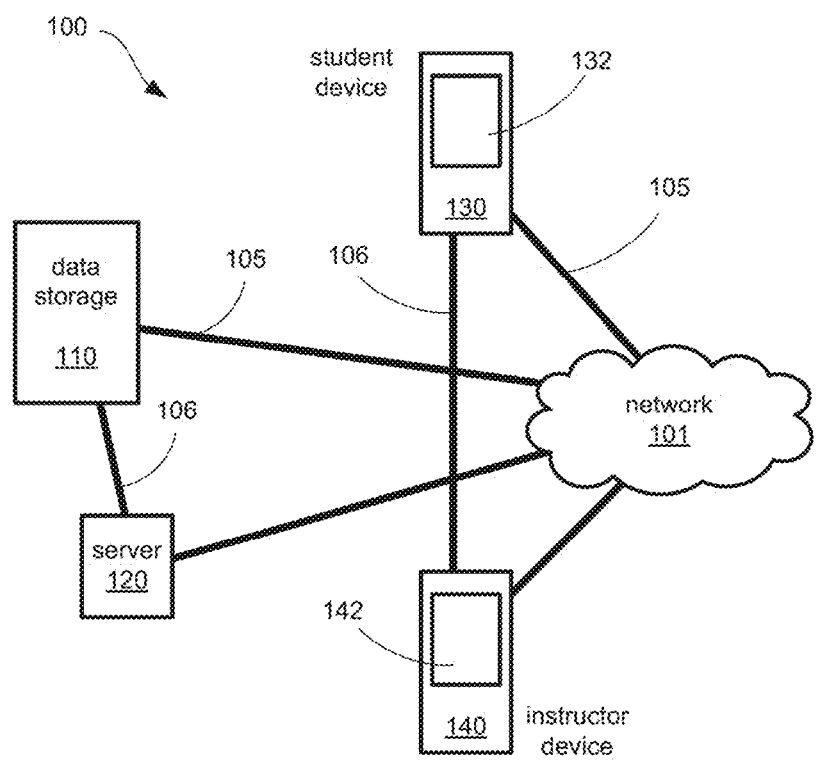
FIG. 1 depicts a network environment in which assisted language learning may be implemented, according to some embodiments.

The features and advantages of the present invention will become more apparent from the detailed description set forth below when taken in conjunction with the drawings.

DETAILED DESCRIPTION

I. Introduction

The embodiments described below relate to computer-implemented language-learning tools and systems that are useful for learning second languages as well as improving performance in a first language. The language-learning tool may be used for the study of logographic and alphabetic languages. The inventor has recognized limitations of conventional language-learning tools and systems, and has conceived of and developed methods and functionality that can improve the efficiency of learning a foreign language with such tools, and increase the flexibility and usefulness of such tools. The described enriched language-learning system supports off-line study on a personal electronic device, personalization of studied subject matter and automated feeds for study text, on-line tutorial sessions, on-line social learning, collaborative development of study text, and detailed, time-dependent analysis of a student's proficiency in a second language.

Among other things, the inventor has recognized that some conventional language-learning tools offer only audio/verbal instruction. As a result, a student may become proficient at hearing and speaking a foreign language, but may not become proficient at reading and writing in the foreign language. Often with such tools, the student stops studying the second language after reaching a minimally-conversant level of proficiency.

Some conventional language-learning systems offer both audio/verbal and written instruction following a standardized course of study, so that a student may gain both verbal and written proficiency in the foreign language. The inventor has appreciated that some of these conventional language-learning systems offer on-line sessions with instructors, but these sessions must be scheduled and are typically scheduled for an extended period of time, e.g., one hour. The inventor has further appreciated that these systems offer conventional type student testing, where a single test score may be computed for a group of translatable items presented to the student.

Although such conventional computer-implemented, language-learning systems can be effective for introducing a student to a second language and developing a minimal or moderate level of comprehension in the language, the inventor has recognized that many students stop using the systems after achieving basic or moderate levels of proficiency. The students typically do not develop a high level of proficiency or become fluent in the language using such conventional tools.

The inventor has recognized and appreciated that one shortcoming of such conventional tools is their allowance for "comprehension gaps." One type of comprehension gap, a "study" comprehension gap, may exist with a student; a student, having studied translatable text at time A, may think he comprehends more at time B than he actually knows at time B. A second type of comprehension gap, an "instructional" comprehension gap, may exist between a student and an instructor or study-mate; an instructor (e.g., when meeting a student for an on-line study session) may not know what the student comprehends well and does not comprehend. In the case of an instructional comprehension gap, on-line sessions may be inefficient because valuable time may be consumed while the instructor tries to figure out the student's level of comprehension and better tailor the session to the student. Further, an instructor that incorrectly assesses or assumes a level of comprehension for a student may begin using words and/or sentence structures unknown to the student without realizing the student's inability to understand the discussion. This can result in the student becoming confused and, in some cases, losing interest in the session so that the student stops acquiring new language skills. As a result, the instructional time can be wasted.

Also, the passage of time can affect what a student knows and does not know in a second language, and this can vary on a word-by-word basis. For example, some words or phrases may be retained better than other words or phrases. Testing a student on words and phrases that are well-known to the student may be a less efficient use of time than testing the student on words and phrases that are less well-known to the student.

The inventor has also recognized and appreciated that greater flexibility would benefit computer-aided language-learning tools. For example, conventional recordings are substantially inflexible in subject matter that is provided to the student when learning a second language. Conventional computer-aided language-learning tools often provide a set course of study that offers limited flexibility in subject matter, though some flexibility may be achieved through scheduled on-line sessions. The inventor has recognized and appreciated that a student may be more motivated to learn a second language when the student can select the subject matter that the student wants to learn.

To reduce problems associated with comprehension gaps, the inventor has conceived of methods and related apparatus for maintaining a time-dependent "memory model" for each student. A student's memory model may comprise a plurality of "memory representations," one for each translatable item and translation aspect that a student has studied, and comprise associated memory-model data such as memory parameters, proficiency values, algorithms, referencing or identifying data, etc. Memory models and related data structures can be incorporated into or otherwise combined with computer-implemented, language-learning programs to provide highly accurate and detailed snapshots of a student's proficiency in a second language or first language, as the student studies the language. Data compiled from a student's memory model can be shared directly (e.g., as confidence values for translatable items) or indirectly (e.g., as color-coded text) with instructors and study-mates or presented to the student to instantly convey the student's current comprehension level, so that on-line instructional or conversational sessions can be more efficiently tailored to the student's level of comprehension than is possible with conventional language-learning systems or traditional classroom settings.

For example, data compiled from a student's memory model can rapidly identify what the student knows well, areas where the student may need testing, refreshing, or further study, and may identify words the student does not know (e.g., words the student has not previously seen). Because the student's comprehension level can be immediately conveyed, even short (e.g., 5-minute) on-line immersion sessions can be effective teaching aids for a student. With effective, short, on-line immersion sessions, computer-implemented language-learning systems can be moved out of the realm of extended, scheduled, on-line instructional session to on-demand, enhanced-immersion sessions that may occur over social networks and throughout the day. Studying a second language at times convenient to a student throughout the day may be more conducive in developing fluency in a second language.

To improve flexibility of the language-learning tool, the system provides for student-selection of subject matter to be studied and on-line collaborative development of study text. For example, a student may enter translatable items that the student would like to study. An on-line assistant may prepare translations for the translatable items or may assist the student in an on-line interactive session. In some implementations, a student may identify news feeds or web sites from which the student would like to retrieve text for study. The language-learning system may automatically retrieve text from the identified sources and filter the text based on the student's current proficiency, as computed from the student's memory model.

These and other aspects of the invention are explained in further detail below. As an aid to understanding the various embodiments, some definitions are provided for frequently used terms. These definitions are intended to serve as a guide for a term's meaning.

As used herein, the term "student" may refer to a person learning a second language. The student may use the enriched language-learning system as a study tool when learning the second language.

The terms "assistant," "instructor," "classmate," "studymate," "interpreter," and "coach" may refer to a person other than the student that assists the student in learning a second language.

The phrase "first language" may refer to a native language of the student. The phrase "second language" may refer to a foreign language being studied by the student.

The phrases "translatable text" or "translation text" may refer to text in the first or second language. Such text may include a word, a phrase, a sentence, a paragraph, or multiple paragraphs.

The phrases "translatable item" or "translation item" may refer to translatable text or to audible utterances in the first or second language.

The phrase "translation aspect" may refer to (1) an aspect of seeing text in the first language and transcribing to the second language, (2) an aspect of seeing text in the second language and transcribing to the first language, (3) an aspect of seeing text in or hearing the first language and orally translating to the second language, (4) an aspect of hearing the second language and orally translating or transcribing to the first language, and (5) an aspect of seeing text in or hearing the second language and writing a phonetic translation in the first language.

The phrase "memory model" may refer collectively to memory representations and memory-model data structures maintained as a dynamic digital record by an enriched language-learning system for a student. A memory model can provide a highly granular, time-dependent, quantitative measure of a student's proficiency in a language studied by the student. For example, a memory model can indicate a student's proficiency on a word-by-word and translation-aspect-by-translation-aspect basis. Data from a student's memory model may also be analyzed in aggregate by the language-learning system to provide one or more aggregate scores or proficiency measures for the student. An enriched language-learning system may maintain individualized memory models for each student-user of the system.

The phrase "memory representation" may refer to a mathematical relationship that estimates the likelihood of a correct, or incorrect, translation aspect as a function of time. Multiple memory representations (e.g., one for each word and translation aspect) may be maintained in the language-learning system for a student. In some implementations, more than one type of memory representation may be used for a student.

The phrase "memory parameter" may refer to a parameter that is used to define a mathematical relationship that is used for a memory representation. For example, a memory parameter may be a half-life value or 1/e value for a memory representation that comprises an exponential decay. In some implementations, more than one memory parameter may be used to define a mathematical relationship for a memory representation.

The phrase "memory-model data structure" may refer to an electronic, magnetic, or optical-based data record (e.g., a digital record) recorded in a data-storage device that contains values (e.g., memory parameters, identifiers for translatable items and translation aspects, proficiency values) and other data representative of a student's memory statistics for a plurality of translation aspects and translatable items studied by the student.

The phrase "proficiency value" may refer to a value computed from a memory representation and/or memory data structure for a translation aspect of a translatable item. The proficiency value may represent the likelihood that the translatable item will be correctly translated by the student for that translation aspect.

The phrase "proficiency summary" may refer to a compilation of data produced from a student's memory-model data structure, e.g., from proficiency values, memory parameters, and/or memory representations.

The term "flashcard" may refer to both a flashcard (or other user-interactive interface) data structure maintained by the language-learning system and an associated flashcard dashboard (or user-interactive interface).

The term "study-text" may refer to both a study-text data structure maintained by the language-learning system and an associated text dashboard.

The terms "program" or "software" may refer to computer code or set of machine-executable instructions that can be employed to program at least one computing device or processor to implement various aspects of enriched language learning. Additionally, it should be appreciated that according to some embodiments, one or more computer programs that, when executed, perform methods of the present technology need not reside on a single computing device or processor, but may be distributed in a modular fashion amongst a number of different computing devices or processors to implement various aspects of the present technology.

The term "associated with," when used in connection with data structures, may be used to describe a combination of data structures. For example, first data associated with second data may mean adding the first data to a data record containing the second data, or vice versa. "Associated with" may mean establishing a relational data structure between first and second data in some embodiments. For example, first data may be entered in a table and/or augmented with an identifier that cross-references or links the first data to second data, even though the first and second data may be stored in different data stores.

The term "transmit," when used in connection with data structures, may be used to describe one or more acts of retrieving data, preparing the data in a format suitable for transmission, identifying at least one destination for the data, and providing the data to a data-transmission device. "Transmit" may include the act of sending the data, by the data preparation or compilation device, to its destination. Acts associated with transmitted data may occur only internal to a device (e.g., transmitting data for display on a display of the device), or may occur external to a device, at least in part (e.g., data prepared by a device is forwarded to an external device, that formats the data for transmission over a network).

II. Overview of Enriched Language-Learning System

FIG. 1 is a simplified diagram depicting a computing environment in which computer-implemented, enriched language-learning may be implemented. According to some embodiments, a computing environment 100 may comprise at least a first electronic device 130 having a video display 132, a data storage device 110, and a server 120. The computing environment may also include at least one second electronic device 140 having a display 142. In some embodiments, the first and second electronic devices 130, 140, data storage device, and server may communicate over a network 101 via data links 105. The network 101 may include intermediary devices, such as routers, satellites, transceivers, etc. In some cases, one or more devices may communicate over a direct communication link 106. Any of the communication links 105, 106 may be wired or wireless communication links. Although FIG. 1 shows only two electronic devices 130, 140, a single data storage device 110, and a single server 120, a computing environment 100 may include hundreds, thousands, or more of such devices.

In various embodiments, the first device 130 may be operated by a student who is learning a second language or desiring to improve his vocabulary in a first language, and the second device 140 may be operated by an instructor or assistant that may assist the student in learning the second language or increasing his vocabulary. Either or both of the first device 130 and second device 140 may comprise a consumer-electronic device having a programmable microprocessor, a data-storage device, and may include hardware and software for communicating over a network or with at least one other device. Either or both of the first device and second device may comprise a portable electronic device, for example, a smart phone, tablet, pad, smart watch, laptop computer, or a personal digital assistant in some embodiments. In some implementations, the first device and/or second device may be a personal computer or other computing device. In some implementations a first device 130 and a second device 140 may communicate directly to each other over a data link 106, and may, or may not, be connected to a network 101. Either or both of the first device and second device may include some or all components described in connection with FIG. 2B.

The term "computer" may be used to refer to a basic or conventional computing device that can perform acts of basic arithmetic (e.g., include calculator functionality) and basic word processing common to a majority of consumer-electronic computing devices. A computer may include basic spreadsheet functionality, and may be configured to communicate over the Internet (e.g., include web browser software and internet modem hardware). An example of a conventional computer is an HP ProBook 450 G1 laptop computer, available from Hewlett-Packard, Inc. of Palo Alto, Calif. This computer may be purchased with an Intel Core i5-4200M Processor 2.5 GHz and Microsoft Windows 7 Professional 64-bit operating system. A computer may be an apparatus that is ready for adaptation for specific functionality with specially-formed machine-readable instructions that may be executed on one or more processors of the computer. A computer that is specially adapted with machine-readable instructions to perform specific functionality (e.g., functionality associated with enriched language learning) that is not currently available for consumer-electronic computing devices is a specially-purposed machine and not a conventional or generic computer.

A data storage device 110 may comprise a single data storage device, or a plurality of data storage devices connected to a network 101. A data storage device 110 may comprise a on-line data-storage facility in some implementations. There may be one or more intermediary devices (not shown) connected between a data storage device that help manage the storage and retrieval of digital data to and from the data storage device. In some embodiments, a data storage device may be operated to store and retrieve memory-model data structures for one or more students using the enriched language-learning system. Data storage devices 110 may be located on-site (e.g., on a university or business campus), or may be distributed at various geographic locations throughout the world. In some implementations, a data storage device may be combined with or incorporated as part of a server 120.

A server 120 that has been configured to implement enriched language-learning functionality according to the present embodiments may include at least one data processor or computing device that has been adapted with specific machine-readable instructions to execute enriched language-learning methods and/or create language-learning data structures according to the embodiments described herein. A server 120 may comprise one or more servers 120 in a server farm, and may be configured to transmit and receive language-learning data structures to and from client devices distributed in a network 101. In some implementations, a data storage device 110 may be connected to a server 120 and be managed by the server. A server 120 may include some or all components described in connection with FIG. 2B.

The network 101 may comprise a piconet, micronet, local area network (LAN), medium area network (MAN), wide area network (WAN), or a combination thereof. In some embodiments, network 101 may be the worldwide Internet. In some implementations, a network 101 may be a network associated with a facility, a university, or a company. Connections to the network may be wired or wireless. A network 101 may include connections to other networks, such as a cellular-phone or mobile-device networks that may include one or more transmission antennas and/or relay stations and base stations. There may be one or more firewalls (not shown) located between a network 101 and a local area network of a plurality of devices, such as an enterprise or agency network.

Figure 2A:
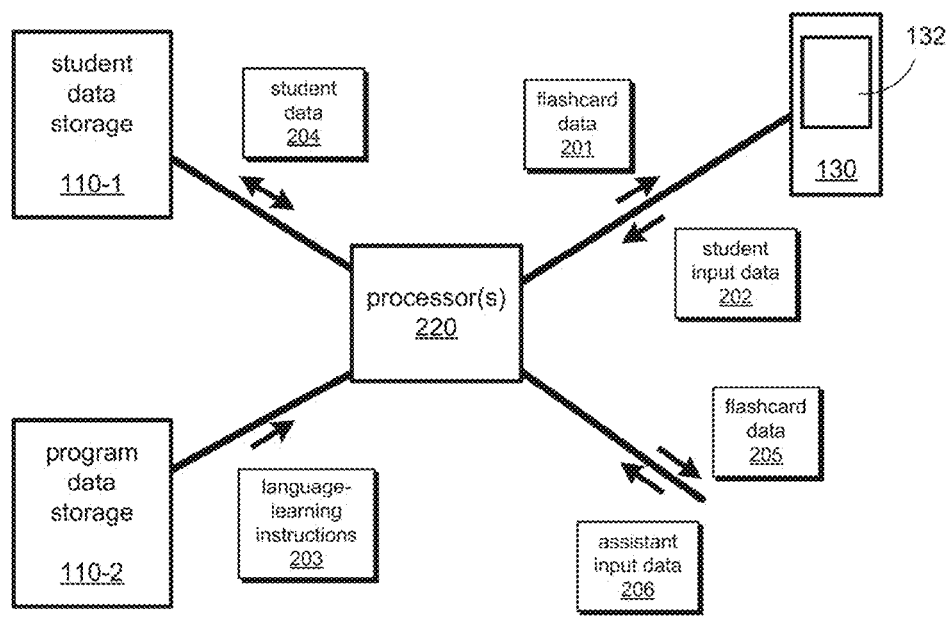
FIG. 2A depicts components that may be active and interconnected in an enriched language-learning system, according to some embodiments.

FIG. 2A depicts various components that may be active in a system or on a device when executing methods of enhanced language learning, according to some embodiments, and also depicts an example of data flow between some system components. In some implementations, the components may be distributed in a networked system of devices, so that aspects of enriched language learning are performed over a network. In some embodiments, the depicted components may be present additionally or alternatively on one device, e.g., electronic device 130, so that aspects of enriched language learning may be performed on a device that is not connected to a network.

According to some embodiments of computer-implemented enriched language learning, at least one processor 220 may communicate with a program data storage device 110-2 on which may be stored machine-readable instructions 203 that, when loaded onto and executed by the processor, specially adapt the processor 220 to perform acts of enriched language learning. According to some embodiments, a processor 220, may comprise any type and form of data processing device, e.g., any one or combination of a microprocessor, microcontroller, a digital signal processor (DSP), an application specific integrated circuit (ASIC), and at least one field-programmable gate array (FPGA). There may be more than one processor in the system in some embodiments, e.g., dual core or multi-core processors, or plural processors communicating with at least one controlling processor. In some embodiments, one or more functionalities of enriched language-learning may be implemented by a dedicated FPGA, DSP, or ASIC. Just one example of a processor is an Intel Core i5-4200M Processor. Another example of a processor that may be adapted to implement acts of enriched language learning is an Apple A8 system-onchip processor that is used in smart phones. The program data storage device 110-2 may comprise any suitable form of non-volatile ROM memory or RAM memory or combination thereof.

The processor 220 may also communicate with student data storage 110-1, which may comprise any suitable form of ROM memory or RAM memory or combination thereof. The processor may receive student data 204 (e.g., language data and memory-model data) for a particular student from, and store such data to, the student data storage device 110-1. The language data and memory-model data may be used by the processor to prepare text or flashcard data 201 that may be sent for displaying interactive text or flashcard dashboards on the display 132 of a device 130. Interactive text dashboards or flashcard dashboards may include translatable items and instructional aides for a student as well as statistical information that may be used to evaluate the student's proficiency in the second language. A processor 220 may also receive student input data 202 from a device 130 as a student interacts with the language-learning system, e.g., using an interactive flashcard dashboard. The received student input data 202 may be processed to update student data 204, and may be included in text or flashcard data 205 that is transmitted to a second device 140 (not shown) for display. A processor 220 may also receive assistant input data 206 (e.g., from an instructor, coach, or study-mate), which may be sent with text or flashcard data 201 for display on the first device 130.

According to some embodiments, data transfer as described in connection with FIG. 2A may occur in real time during an on-line, network session. During the on-line session, the student device 130 may, or may not, be in communication with a second device 140. In some embodiments, a student may operate a student device 130 off line, e.g., not connected to a network and/or not logged into the language-learning system. The student device may include a local copy of most recently updated language-learning instructions 203 and student data 204 that allow the student device 130 to implement some acts of the enriched language-learning system (e.g., studying and being quizzed using flashcard dashboards and text dashboards). At least some of the data transfer as described in connection with FIG. 2A may occur locally on the student device 130 during an off-line session. At a later time, the student device may connect with the language-learning system, after which updated copies of student data 204 may be uploaded to networked data storage devices 110 of the language-learning system and any queued requests may be uploaded and processed by one or more servers 120 of the language-learning system.

Figure 2B:
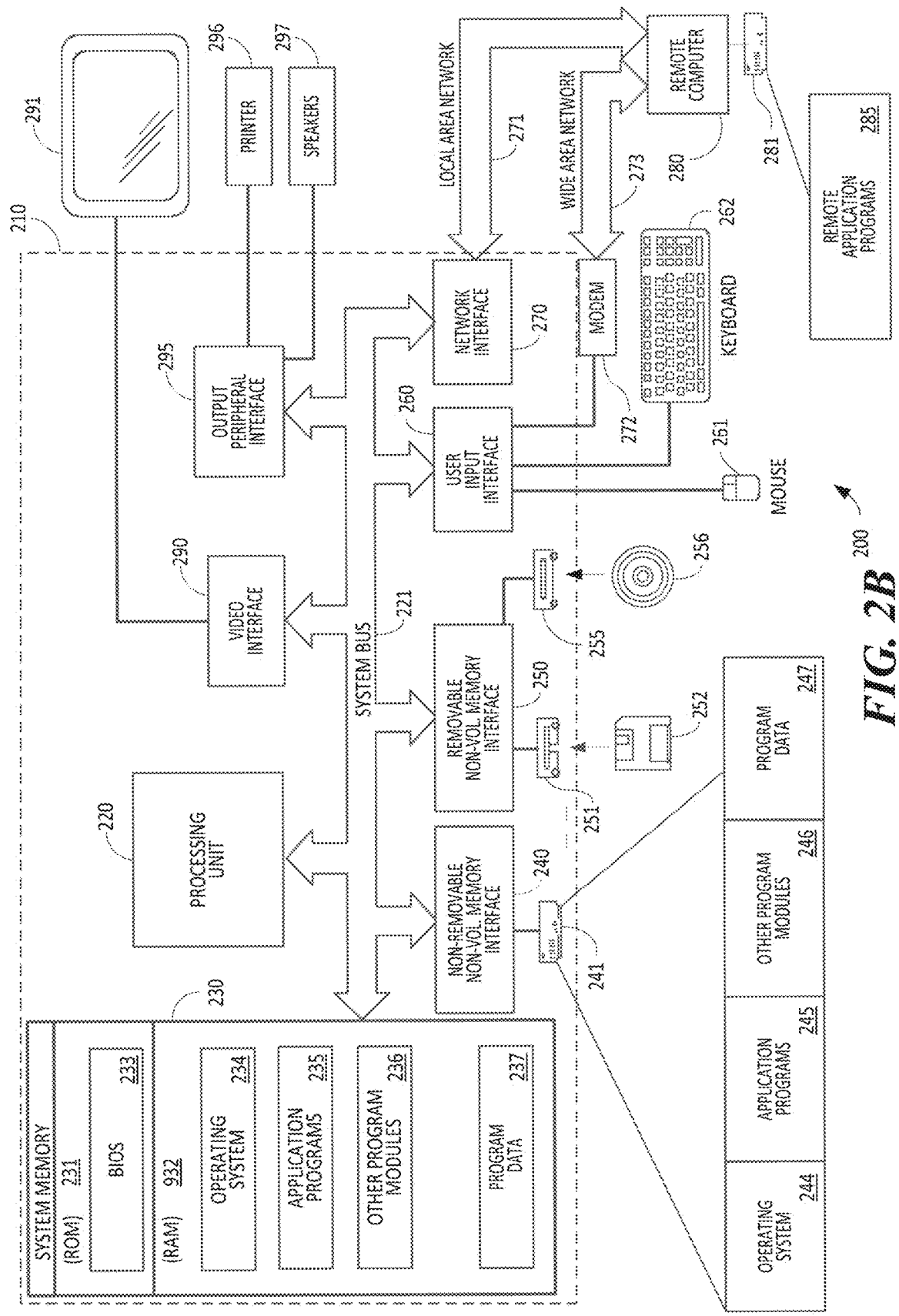
FIG. 2B depicts components that may be included on a device used for enriched language learning, according to some embodiments.

FIG. 2B depicts components that may be included on a student device 130, assistant device 140, and/or server 120 adapted to perform acts of enriched language-learning, according to some embodiments. Some or all of the components shown may be present in a device or server. In a distributed computing environment, some components may be located on a server and some components may be located on a client device. In some embodiments, a device for implementing enriched-language may include a computing device 210. Components of computing device 210 may include, but are not limited to, a processor 220, a memory 230, and a bus 221 that couples various components including the memory to the processor 220. The bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 may include one or more types of machine-readable media. Machine-readable media can be any available media that can be accessed by computer 210 and includes both volatile and non-volatile, manufactured storage media, removable and non-removable manufactured storage media. By way of example, and not limitation, machine-readable media may comprise information such as computer-readable instructions, data structures, program modules, libraries, or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information, and which can be accessed by computing device 210.

The memory 230 may include computer storage media in the form of volatile and/or non-volatile memory such as read only memory (ROM) 231 and random access memory (RAM) 232. A basic input/output system 233 (BIOS), containing the basic routines that help to transfer information between elements within computing device 210, such as during start-up, may be stored in ROM 231. RAM 232 may contain data and/or program modules that are immediately accessible to and/or presently being operated on by processor 220. By way of example, and not limitation, FIG. 2B illustrates an operating system 234, application programs 235, other program modules 236, and program data 237.

A computing device 210 may also include other removable/non-removable, volatile/nonvolatile machine-readable media. By way of example only, FIG. 2B illustrates a hard disk drive 241 that reads from, or writes to, non-removable, nonvolatile magnetic media, a magnetic disk drive 251 that reads from, or writes to, a removable, nonvolatile magnetic disk 252, and an optical disk drive 255 that reads from, or writes to, a removable, nonvolatile optical disk 256 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 241 may be connected to the system bus 221 through a non-removable memory interface such as interface 240, and magnetic disk drive 251, and optical disk drive 255 may be connected to the system bus 221 by a removable memory interface, such as interface 250.

The drives and their associated machine-readable media discussed above and illustrated in FIG. 2B, provide storage of machine-readable instructions, data structures, program modules and other data for the computing device 210. In FIG. 2B, for example, hard disk drive 241 is illustrated as storing operating system 244, application programs 245, other program modules 246, and program data 247. These components may either be the same as, or different from, operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computing device 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices may be connected to the processor 220 through a user input interface 260 that is coupled to the system bus, but may be connected by other interface and bus structures, such as a parallel port, game port or a universal serial bus (USB). A monitor 291 or other type of display device may also be connected to the system bus 221 via an interface, such as a video interface 290. In addition to the monitor, a computing device 210 may also include other peripheral output devices such as speakers 297 and printer 296, which may be connected through an output peripheral interface 295.

A computing 210 may operate in a networked environment using logical connections to one or more remote devices, such as a remote computer 280. The remote computer 280 may be a personal computer, a server, a router, a network PC, a peer device or other common network node, and may include many or all of the elements described above relative to the computing device 210, although only a memory storage device 281 has been illustrated in FIG. 2B. The logical connections depicted in FIG. 2B include a local area network (LAN) 271 and a wide area network (WAN) 273, but may also include other networks. Such networking environments may be commonplace in offices, enterprise-wide computer networks, intranets and the Internet. Network connections may include wired, optical fiber based, or wireless data links.

When used in a LAN environment, a computing device 210 may be connected to the LAN 271 through a network interface or adapter 270. When used in a WAN networking environment, a computing device 210 may include a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in one or more remote memory storage devices. By way of example, and not limitation, FIG. 2B illustrates remote application programs 285 as residing on memory device 281. It will be appreciated that the network connections shown are exemplary and other means of establishing a communications link between one or more additional computing devices may be used.

Figure 3:
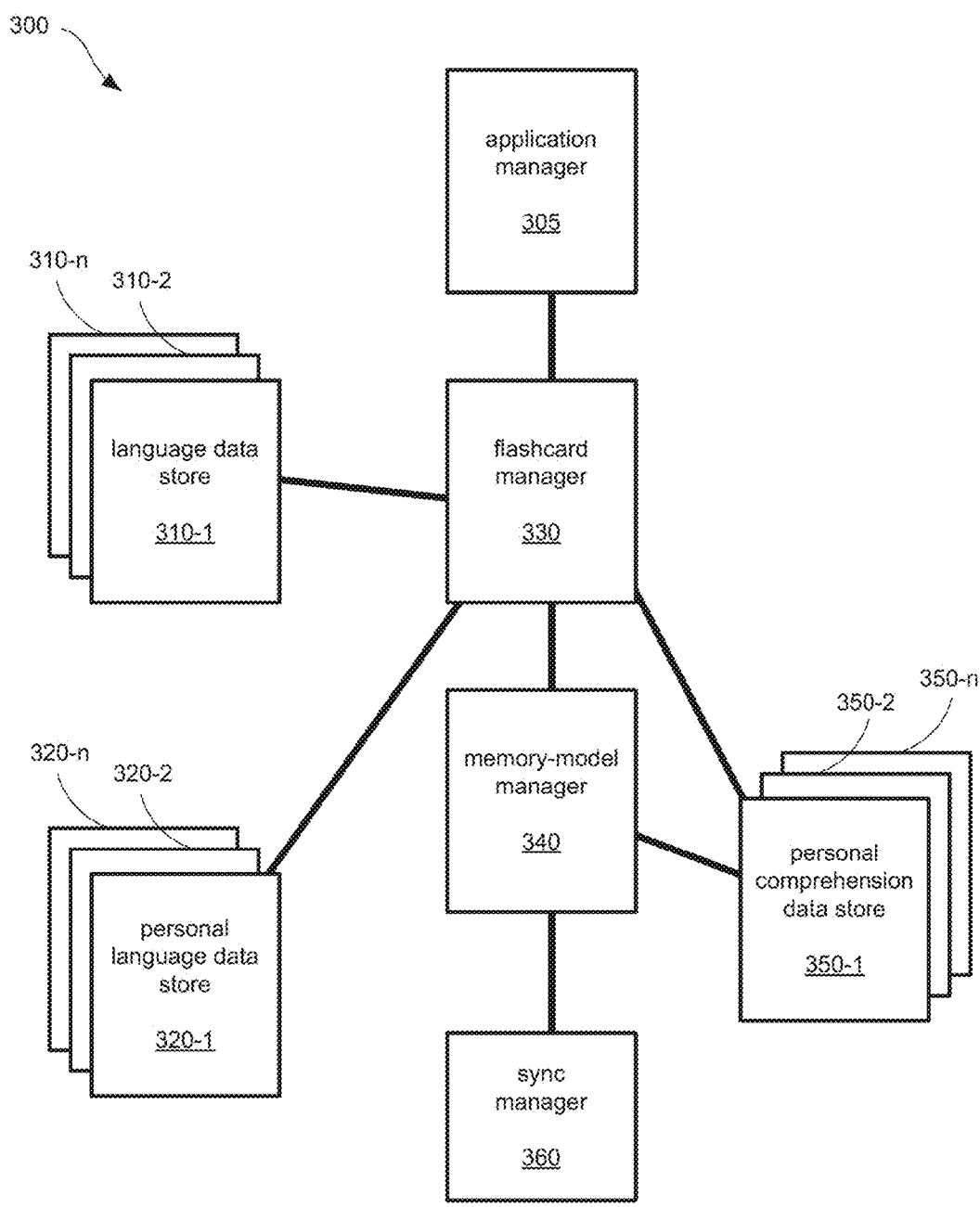
FIG. 3 illustrates application components that may be used to adapt at least one device to implement enriched language-learning functionality, according to some embodiments.

FIG. 3 illustrates application components 300 that may be used to adapt at least one computing device to implement enriched language learning, according to some embodiments. An enriched language-learning system may comprise a combination of stored data, programming code, and hardware on which the programming code may be executed. According to some embodiments, a language-learning system may include an application manager 305, a flashcard manager 330, a memory-model manager 340, and a synchronization manager 360. The flashcard manager 330 may be in communication with language data 310-1 and personal language data 320-1. In some implementations, the memory model manager 340 may be in communication with personal comprehension data 350-1. Each of the manager components may communicate with each other according to some embodiments and/or communicate with the application manager 305. In some implementations, two or more manager components may be combined in a section of computer code. For example, the synchronization manager 360 may comprise code within the application manager 305 that is executed during operation of the application manager. In some cases, the personal language data store and personal comprehension data store may be combined and stored together on a common data storage device.

The application manager 305 may comprise machine-readable instructions, hardware (for example, digital logic elements or field programmable gate arrays), firmware, or a combination thereof. As an example, an application manager may comprise machine-readable instructions that may be stored in program data storage 110-2 and loaded onto, and executed by, a processor 220. In some implementations, an application manager 350 may comprise an FPGA (e.g., an array of transistors) configured to perform at least one application manager function described below. An application manager may oversee operation of an implementation of a enriched language-learning on a device, and communicate with and/or control other managers of the system. For example, the application manager 305 may oversee and control timing of data exchanges and memory updates within an enriched language-learning system. The application manager may oversee launching and closing of an instantiation of enriched language-learning on one or more devices. An application manager may also interface with an operating system of a device on which enriched language-learning is implemented.

A flashcard manager 330 may comprise machine-readable instructions, hardware (for example, digital logic elements or field programmable gate arrays), firmware, or a combination thereof. As an example, a flashcard manager may comprise machine-readable instructions that may be stored in program data storage 110-2 and loaded onto, and executed by, a processor 220. In some implementations, a flashcard manager 330 may comprise an FPGA (e.g., an array of transistors) configured to perform at least one flashcard manager function described below. In some embodiments, a flashcard manager may receive student data from one or more data storage devices and/or data that is input by a user of the system, and prepare text or flashcard data to send for display on a video display of a device on which the language-learning system is implemented. For example, a flashcard manager 330 may receive or retrieve personal language data (e.g., translatable items) from a student's personal language data store 320-1, and prepare the data to display in a flashcard dashboard on a display device for a user (e.g., the student, an instructor, study-mate, and/or interpreter). The displayed flashcard dashboard may be an interactive display (such as a dashboard, panel, gadget, or window) with which the user may work on or study the translatable item.

A flashcard manager may receive data for text or flashcard dashboards and associated data structures from additional or alternative sources, e.g., a language data store 310-1, a personal comprehension data store 350-1, and from user and/or instructor input. For example, a student may request translation data from a language data store 310-1 for a particular language. A language data store may be accessed for words or phrases that are newly presented to a student responsive to a student requesting a translation. A flashcard manager may prepare data received from any source for display with a text or flashcard dashboard or summary dashboard.

A language data store may comprise a collection of words and phrases translated between two or more languages, e.g., a collection of digital foreign-language dictionaries that may be cross-translated. For example, a first language data store 310-1 may comprise words and phrases (including text and audio representations) in English, a second language data store 310-2 may comprise corresponding words and phrases in French, and an $n^{th}$ language data store 310-n may comprise corresponding words and phrases in Chinese. A language data store may be maintained on-line, e.g., stored in networked data storage devices 110, and serviced by one or more servers 120. In some implementations, a language data store may be stored on a local device, e.g., a personal computer or other device with sufficient memory space.

In some implementations, a flashcard manager 330 may access a personal language data store 320-1 for a student or user. An enriched language-learning device may maintain digital "personal language" data records for each user that contains translatable items studied or worked on by the user. For example, a first personal language data store 320-1 may include all translatable items (with French-English translations) studied by a first student. A second personal language data store 320-2 may include all translatable items (with French-Chinese translations) studied by a second student. An $n^{th}$ personal language data store 320-n may include all translatable items (with German-English translations) worked on by a first interpreter. After a user studies or works on translatable items, corresponding data may be stored to the user's personal language data store. This data store therefore keeps a record of what has been presented to a student and what the student knows. The data store also maintains a status of flashcard data structures or study-text data structures on which the student or user is currently studying or working on, so that the study or work can be suspended (e.g., storing a current version by the flashcard manager 330) and resumed (e.g., retrieving a last updated version by the flashcard manager 330) at a disjoint times. Additionally, data from a student's personal language data store and data from a student's personal comprehension data store may be compiled to indicate a proficiency of the student in the second language.

A memory model manager 340 may comprise machine-readable instructions, hardware (for example, digital logic elements or field programmable gate arrays), firmware, or a combination thereof. As an example, a memory manager may comprise machine-readable instructions that may be stored in program data storage 110-2 and loaded onto, and executed by, a processor 220. In some implementations, a memory manager 340 may comprise an FPGA (e.g., an array of transistors) configured to perform at least one memory manager function described below. A memory model manager may run in the background when a student is using the enriched language-learning system (e.g., working with flashcard dashboards and text dashboards), and track the student's interactions with the system to develop and update memory representations and memory-model data descriptive of the student's proficiency in the second language. For example, the memory model manager may keep track of correct and incorrect translations and the time at which correct and incorrect translations are provided by a student to develop memory representations for the student for each word or phrase studied by the student and for each translation aspect. In some implementations and after development of a memory representation for a particular word, for example, the memory model manager may dynamically calculate one or more proficiency values for the student for that word based on the memory representation and temporal data. The memory model manager 340 may be in communication with a personal comprehension data store 350-1 for a student, where memory model parameters and/or proficiency values for the student are stored and updated. The personal comprehension data store may comprise a memory-model data record for each student that uses the enriched language-learning system.

In some embodiments, a personal language data store 320-1 and a personal comprehension data store 350-1 may be combined into a single data storage location. In some implementations, either or both of a personal language data store 320-1 and a personal comprehension data store 350-1 may be stored in a networked data storage device 110 and/or locally on a student device 130.

A sync manager 360 may comprise machine-readable instructions, hardware (for example, digital logic elements or field programmable gate arrays), firmware, or a combination thereof. As an example, a sync manager may comprise machine-readable instructions that may be stored in program data storage 110-2 and loaded onto, and executed by, a processor 220. In some implementations, a sync manager 360 may comprise an FPGA (e.g., an array of transistors) configured to perform at least one sync manager function described below. In some embodiments, a sync manager may maintain up-to-date records for a user, which may entail updating data in a personal language data store 320-1 and/or a personal comprehension data store 350-1. These records may be updated as a user interacts with the language-learning system, or at times that a user logs onto or off from the system, so that a student's proficiency is accurately tracked with each use of the system, for example. In some embodiments, a sync manager may also provide synchronization between connected devices, for example, a student's device 130 and an instructor's device 140, so that the student and instructor may be viewing the same information at substantially the same time on different devices. In some embodiments, a sync manager 360 may cause transmission of at least some of a student's current comprehension data (e.g., proficiency values relevant to a flashcard dashboard or text dashboard shared between the student and an instructor) during an interactive, on-line session, so that the instructor can readily view and evaluate the proficiency of the student for translatable items on the shared dashboard.

III. System Interaction and Dashboards

According to some embodiments, a student may log onto an enriched language-learning system or open an enriched language-learning application. The system may display an introductory list of items that the student last worked with when using the system. In some implementations, the listed items may refer to flashcard or text dashboards that the student uses to study the second language. The introductory list of items may identify an author of each item (e.g., student, system, or instructor), when the item was last studied, whether the item was bookmarked, and a completion status of the item. The student may then select an item (e.g., an identifier for a flashcard or text dashboard) from the list to study, and then begin working with a dashboard. Although dashboards are described for visual display and user interaction, any other type of user-interactive interface may be used in some embodiments (e.g., pop-up windows or panels, web page, frame, etc.)

Figure 4A:
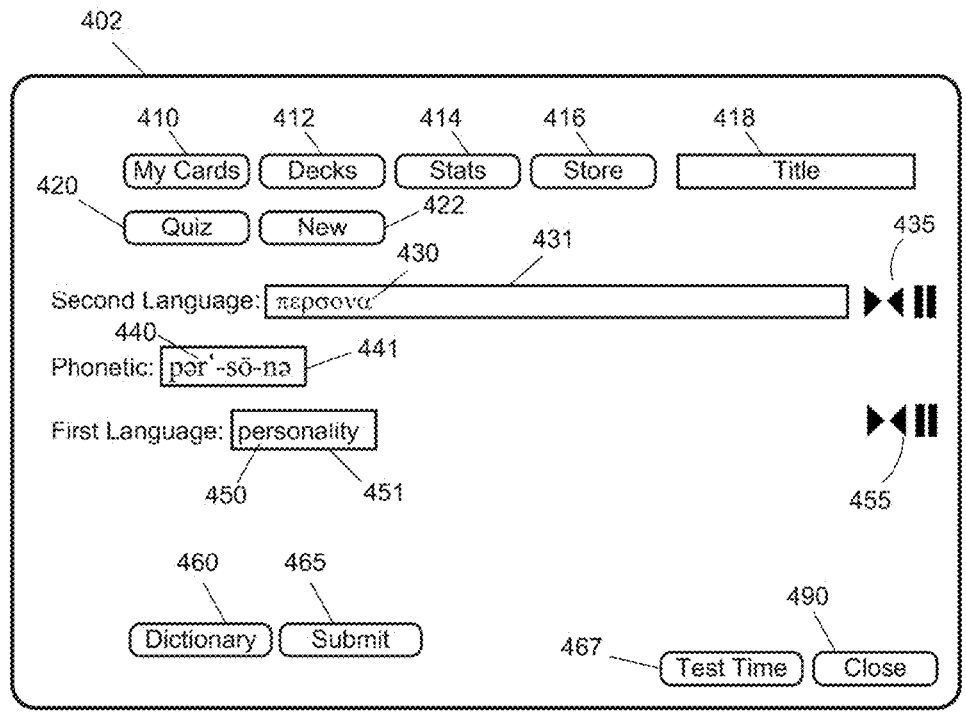
FIG. 4A depicts a user-interactive flashcard dashboard, according to some implementations.

FIG. 4A depicts just one example of an interactive flashcard dashboard 402 that may be used by a user in an enriched language-learning system. A flashcard dashboard 402 may comprise a visually-displayed, graphical-user-interface panel, dashboard, window, or page that may be rendered on a display 132, 142 of an electronic device 130, 140. The display may comprise any suitable display (e.g., an LCD display, an LED display, a plasma display, a CRT display, etc.) In some implementations, the display may be a touch-screen display that senses a user's touch and that is used by the device to detect user selection of displayed elements of a flashcard dashboard and data entry into a flashcard dashboard. Though, in some embodiments, selection of flashcard dashboard elements and data entry may be performed by other methods, e.g., mouse input operations, keyboard operations, voice commands, etc.

A flashcard or text dashboard may be prepared in part by a flashcard manager 330, for example, by assembling text or flashcard data 201 that will determine the appearance and interactive capabilities of a displayed text dashboard or flashcard dashboard 402. Flashcard or text data may comprise language data, student proficiency values, audio data, and translatable items that are stored and/or retrieved by the language-learning system, as well as display commands that may be interpreted by a device 130, 140 to generate a graphical rendering of the flashcard dashboard. In some embodiments, flashcard data may further comprise template data that is common to different types of flashcards and that may be stored on a device (e.g., a server or user device). In some implementations, the language-learning system may store a flashcard data structure or text data structure associated with each flashcard and text dashboard that the student uses. Flashcard or text data, when processed for graphical display by a device, may generate a user-interface panel or dashboard appearing like the illustrations in FIGS. 4A-5C. Flashcard and text dashboards may be configured to display translatable items as well as prompt and receive user input. In various embodiments, a flashcard or text dashboard may be used by a student to study, and be quizzed on, one or more translatable items associated with the flashcard or text dashboard.

As just one example, flashcard or text data may comprise elements of a widget that can be launched on any one of Apple Inc.'s Mac operating systems that supports widgets. Flashcard data may comprise hypertext markup language (HTML) code, cascading style sheets (CSS) code, and/or javascript code. The included code may comprise instructions relating to the style of the dashboard and instructions for receiving user input through text boxes, active buttons, tabs, etc. There may be one or more files prepared for each flashcard or text dashboard when a flashcard or text data is prepared and that are used when the flashcard or text dashboard is displayed. Data retrieved for a dashboard or other user-interactive interface and received via a dashboard or other user-interactive interface may be read from and stored to files on the language-learning system using conventional file open, read, write, and close commands.

According to some embodiments, a text or flashcard dashboard 402 may include active buttons (e.g., menu tabs 410, 412, 414, 416 that can alter the dashboard display, a "quiz" button 420, audio buttons 435, 455, etc.) as well as information display regions and data entry regions. A dashboard may, or may not, display translatable text 430 in second language in a translatable text display and data entry region 431, a phonetic pronunciation 440 of the translatable text in a phonetic display and data entry region 441, and a translation 450 of the translatable text in the first language in a translation display and data entry region 451. A dashboard may also contain play, rewind, record, and/or pause buttons 435, 455 for the translatable text 430 and the translation 450.

In some embodiments, translatable text 430 of a flashcard or text dashboard may be pre-selected by the enriched language-learning system. For example, the system may access stored data structures (e.g., stored in a language data store 310-1) that include basic vocabulary, basic phrases, and basic sentences that are typically used in introducing an individual to a second language. In some implementations, translatable text 430 for a flashcard or text dashboard may be entered by a student or instructor via a student device 130 or instructor device 140, and associated with a newly-created flashcard or text dashboard for the student.

A flashcard dashboard 402 may be used in at least two different ways. In a first "study" mode, a user may select or create a flashcard that includes a translatable item that the user wishes to study. In this "study" mode, a flashcard dashboard may be first presented to a student in a traditional manner that displays simultaneously translatable text 430, its phonetic pronunciation 440, and its translation 450 into the first language. The student may then study the flashcard dashboard to memorize the translation and pronunciation for the translatable text. In a second "quiz" mode, a student may indicate she is ready to be tested on the translatable text, e.g., by activating a "quiz" button 420. The enriched language-learning system may then, at a later time that may or may not immediately follow activation of the "quiz" button, present a translatable item associated with the flashcard to the student and prompt a translation from the student.

In some embodiments, a text or flashcard dashboard may include other buttons. For example, a flashcard dashboard may include a "flag" button that a student may activate to indicate that translatable text of the flashcard is important to the student, and should be learned by the student. A flagged flashcard may appear differently in a list of flashcards that the student has studied, or may have a distinguishing symbol (e.g., a flag or asterisk) associated with the flashcard title in a list. As another example, a flashcard dashboard may include a "hide" button that a student may activate to hide first language or second language displays, so that the student may quickly test himself and toggle the translations back and forth.

According to some embodiments, a flashcard or study-text is flagged automatically by the language-learning system when first created for a student. In some implementations, a flashcard or study-text may remain flagged until the language-learning system determines that the information on the flashcard or study-text has been learned to a satisfactory level, as determined by a memory representation for the flashcard or study-text. For example, if the language-learning system determines, based on a memory representation, that the student will correctly translate any translatable item of the flashcard or study text with a probability above a predetermined threshold (e.g., 70%), the system may automatically remove the flag from the flashcard or study-text. If at a later time, the language-learning system determines, based on the memory representation, that the probability of a correct translation for any translatable item falls below the predetermined threshold, the system may automatically re-flag the flashcard or study-text so that it can be presented again to the student for study.

A text or flashcard dashboard 402 may include a "card" button 410 that may be activated by a student to select a listing of flashcards and/or study-texts that have been studied by the student. In some implementations, the student may select (e.g., by touch, mouse click, voice command, etc.) one of the flashcards or study texts from the list for display and study. Flashcards and study texts may be identified by a distinctive title 418, which may be displayed in a listing of flashcards and study texts. The title may be edited by a user via the flashcard or text dashboard interface. For a single-word flashcard, the title may be automatically assigned by the language-learning system as the word appearing on the flashcard.

A text or flashcard dashboard 402 may include a "decks" button 412 that may be activated to select a listing of decks. In some embodiments, flashcards and/or study-texts may be organized by a student and associated with different decks that may be titled and organized by the student. For example, a student may store groups of flashcards, arranged by topical subject matter, into associated decks. For example, the enriched language-learning system may receive input from a student (e.g., after activating a "new deck" button) to title a deck "first meeting." The student may then associate flashcards with this deck that include words, phrases, or sentences that a person would likely speak when first meeting a stranger. As another example, a student may create a "house" deck that associates flashcards containing words, phrases, or sentences relevant to items found in a home with the deck. There may be tens, hundreds, or more flashcards associated with one deck, and a same flashcard may be associated with more than one deck. A "decks" button 412 may provide a listing of deck identifiers (e.g., deck titles), so that a user may select one of the decks for study.

A text or flashcard dashboard 402 may also include a "quiz" button 420 and a "new" button 422, according to some embodiments. For example, the "quiz" button may be activated by a user (student or instructor) to test a student on one or more translatable items on a flashcard dashboard. Responsive to activation of the "quiz" button, the language-learning system may subsequently present the flashcard dashboard to the student with a translatable item, so that the student is prompted to provide a translation to the system. The provided translation may comprise text entered by the student or a voiced response that may be recorded and compared against a prior voice response recorded by the student when first studying the flashcard. The presented flashcard dashboard may show none or at least one of the translatable text 430, the phonetic pronunciation 440, or the first language translation 450. In this manner, a student may be tested on any one of the translatable aspects for a translatable item studied by the student.

In some implementations, a test time on a translatable item may be selectable by a student. For example, a student may provide input to the language-learning system (such as in a student "preferences" or "settings" dialogue window, or via a "test time" button 467 on each dashboard) indicating when quizzes on a flashcard or study-text should occur, whether quizzes should be at random times or on a regular schedule, and at what frequency the quizzes should occur. In some implementations, a student may further specify when the quizzes for a flashcard or study-text should terminate (e.g., after one week, one month, two months, etc.).

If nothing is shown on flashcard dashboard 402 that is presented for a quiz, a device student device 130 may automatically play an audio recording of a translatable item or one of the play button's 435, 455 may be highlighted so that the student may activate the highlighted play button. Input received from the activation may cause an audio reproduction of the translatable item in the second language. The student may then enter a text translation in the first language into the translation data entry region 451, or may speak the translation in the first language. A spoken translation may be recorded by the device 130 and compared against a spoken translation recorded when the student first studied the flashcard. Conversely, if the audio prompt is in the first language, the student may speak the translation into the second language. On the other hand, if a translatable text 430 is shown at presentation of the text or flashcard dashboard 402 for a quiz, the student may type the translation 450 in the first language.

According to some embodiments, a translation aspect for which a student is tested may be selected at random, or according to a predetermined testing algorithm, by the language-learning system. An example of a predetermined testing algorithm may comprise testing the student first and/or most frequently on a translation aspect for which the student typically exhibits a lowest proficiency value across all translatable items. In another embodiment, a testing algorithm may comprise testing the student first and/or most frequently on a translation aspect for which the student exhibits a lowest proficiency value for that particular translatable item. The language-learning system may determine the student's proficiency value for any translatable item and translation aspect from the student's memory model. In some embodiments, a student may designate which translation aspect, or in which order translatable aspects, should be tested.

Responsive to activation of a "new" button 422, the language-learning system may present a blank text or flashcard dashboard 402 to a student, and allow a student to enter data to develop his own flashcard. The inventor has recognized and appreciated that individuals may increase their proficiency in a foreign language when the individuals can designate the text that they wish to learn or speak in a second language. Accordingly, an enriched language-learning system is flexible in that it allows a student to select text for study that is of importance to the student. In some embodiments the student may copy or import one or more words from the second language into the translatable text window 431. For example, the student may copy text from a news feed into the translatable text window 431 (if copied in the second language) or into the translation window 451 (if copied in the first language). The student may then begin working on the newly-created study-text or flashcard dashboard, entering translations of the copied text. While working with a dashboard, a student may consult a dictionary (e.g., a language data store 310-1) by highlighting a word and activating a "dictionary" button 460, for example. The highlighting of a word and activation of the "dictionary" button may provide data input that the language-learning system uses in forming a search query for a translation of the highlighted word. Additionally, a student may record the student's speaking of the translation item and its translation. When finished working with a dashboard, the student may activate a "store" button 416, providing input that the language-learning system identifies as a comment to store the new flashcard or study-text data. Responsive to activation of a "store" button, a flashcard manager 330 may send data associated with the flashcard or study-text to a student's personal language data store 320-1, according to some embodiments.

In some embodiments, the language-learning system may automatically create a flashcard for a student when the student highlights a word of text and searches for a translation of the word in an on-line dictionary. The language-learning system may first determine whether a flashcard exists for the word. If a flashcard exists, the system may re-flag the flashcard. If a flashcard does not exist, the system may create a new flashcard for the student, and automatically flag the flashcard for the student.

Figure 4B:
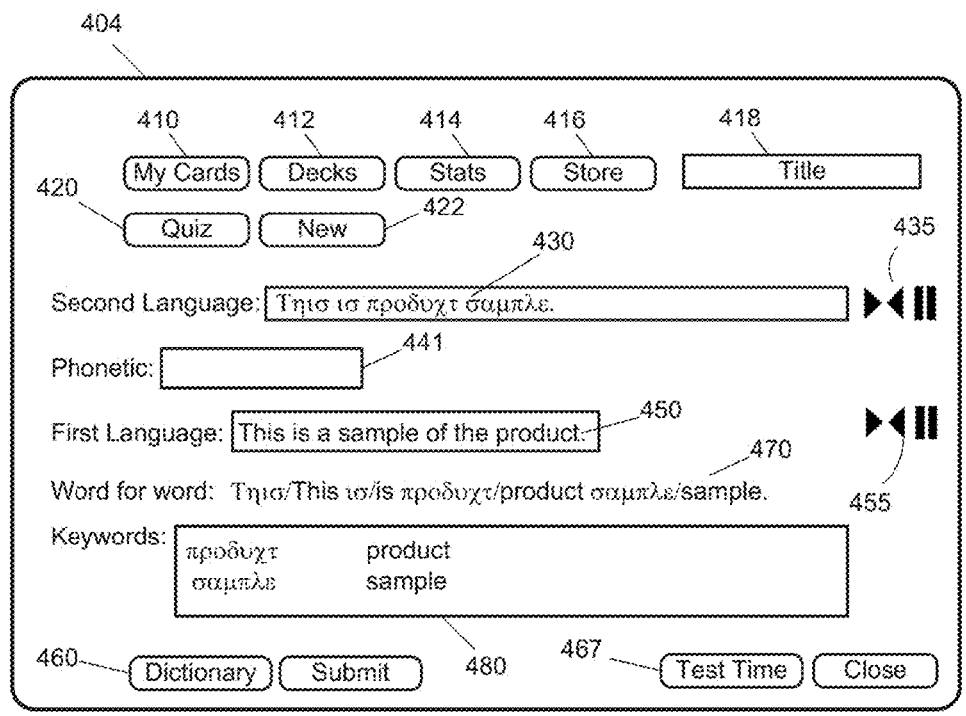
FIG. 4B depicts a user-interactive flashcard dashboard, according to some implementations.

FIG. 4B depicts an example of a flashcard dashboard 404 that may be presented by the enriched language-learning system to a student, so that the student may study more than one word of translatable text 430. In this example, the translatable text comprises a sentence, though the translatable text 430 may comprise a phrase or short paragraph in some embodiments. According to some embodiments, a flashcard dashboard may include a word-for-word translation 470 of multi-word translatable text, so that the student may gain some understanding of the phrase or sentence construct and/or basic grammatical rules in the second language.

In some embodiments, a flashcard or text dashboard may include a "keywords" data display and data-entry window 480 in which a student or user may enter (type or copy) one or more keywords from the translatable text 430. In some implementations, a keyword other than a word from the translatable text 430 may be entered (e.g., a word descriptive of the subject matter of the translatable text). Keywords may be associated with the translatable text by the language-learning system for subsequent searching purposes. For example, a student may submit a search query to the language-learning system that includes a keyword. Responsive to receiving the search query, the language-learning system may identify one or more flashcards and/or study-texts from a student's personal language data store 320-1 with which the keyword has been associated, and indicate the one or more flashcards and study-texts on the student's device (e.g., in a list). In this manner, a student may readily obtain one or more examples of how the keyword in the second language is used in a phrase or sentence. Alternatively, the student may readily retrieve words or phrases used in connection with subject matter associated with the keyword. One or more keywords may be entered for each flashcard and study text.

Figure 4C:
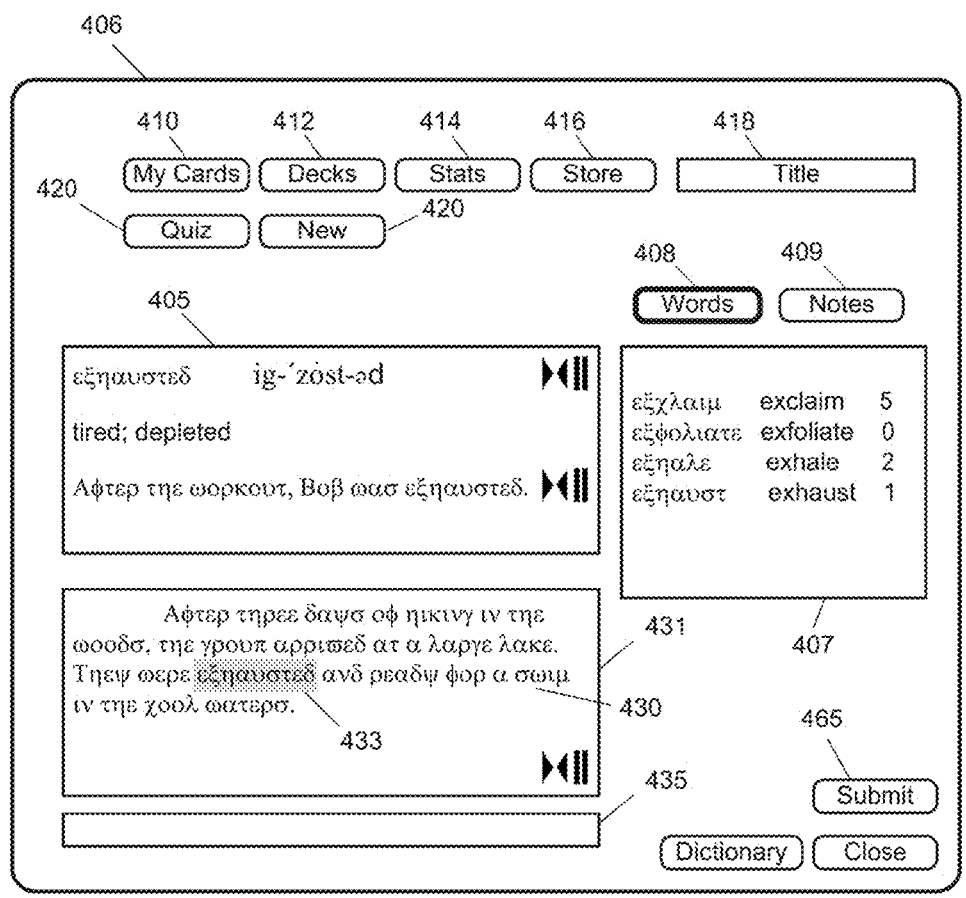
FIG. 4C depicts a user-interactive text dashboard, according to some implementations.

Longer sections of text may be studied using study-text dashboards of the enriched language-learning system, according to some embodiments. FIG. 4C depicts an example of a text dashboard 406 in which a short paragraph of translatable text 430 is displayed for study. Although a short paragraph is shown to simplify the illustration, long paragraphs and multiple paragraphs may be studied using a study-text dashboard. The study text may have been entered by a student (e.g., typed or copied) or by an instructor. As the student works on translating the text in "study" mode, the student may select one or more words in the study-text (e.g., by highlighting the word, placing a cursor on the word, touching the display at the location of the word). The selected word 433 or words may indicate text that the student does not know or is unsure about. According to some embodiments, the student may enter a translation for the word in a translation window 451, or record a translation with the system by voice input. The language-learning system may determine whether the student has provided a correct translation, record the time and result for the translatable item and translation aspect, and provide an indication to the student regarding the correctness of the translation. In some implementations, a student may optionally activate a "dictionary" button to request a translation of a selected word 433. The language-learning system may then provide an extended translation in a dictionary translation window 405. This window may further allow the student to play audio recordings of the selected word 433 and view phonetic translations, as well as additional uses or meanings of the word.

According to some embodiments, a text dashboard may include a "words" window 407 (activated by a "words" button 408 or voice command) that may display a list of translatable items that are similar to selected word 433 identified by the student and that have been previously studied by the student. The listed translatable items may include translations and a number of flashcards and study-texts in which the listed items have been used. The listed translatable items may aid the student in translating the selected word 433. In some embodiments, a user may select (e.g., click on or speak) one of the listed translatable items to navigate to one or more flashcards and study-texts associated with the listed translatable item. The display of similar words in the words window 407 may provide helpful cues to a student for logographic languages. In some implementations, if a student has previously studied the selected word 433, the language-learning system may, at least temporarily, omit the selected word from the listing of words in the word window 407, so that the student can try to deduce the word's translation.

In some embodiments, some of the translatable text 430 may be displayed in different colors by the language-learning system. As one non-limiting example, a majority of the text may appear in a first color, e.g., black. The first color may indicate words in the text that the student should know. For example, the language-learning system may determine from the student's memory model that the probability of the student providing a correct translation for words of the first color is above a first predetermined threshold level (e.g., 85%, though other values may be used), and therefore color code these words using the first color. In some implementations, words appearing in the first color may correspond to words of un-flagged flashcards for the student. Some of the words may appear in a second color, e.g., red. The second color may indicate words that the student is currently studying (e.g., there exists a corresponding flagged flashcard) and/or is less likely to provide a correct translation. For example, the language-learning system may determine from the student's memory model that the probability of the student providing a correct translation for words of the second color is below a predetermined threshold level, which may be the same as or different from the first predetermined threshold level, and therefore color code these words using the second color. In some embodiments, some of the words in a translatable text 430 may appear in a third color, e.g., green. Words appearing in a third color may be words that the student has not previously seen. For example, the system may determine there may be no corresponding word stored in the student's personal language data record 320-1. By color coding words in translatable text, a student or instructor can, at a glance, determine a difficulty level of the text for the student.

In some embodiments, the language-learning system may determine a level of difficulty of translatable text for a student using the metrics that are used to color code text. The language-learning system may then automatically retrieve text (from on-line news or media feeds, for example), filter the text according to difficulty level, and only provide text to the student having an appropriate level of difficulty for the student. An appropriate level of difficulty may be determined from a student's past level of performance, in some cases, or may be a predetermined rule. For example and without being limited to particular values, a predetermined rule may be to present text in which 85% should be known by the student (e.g., black text words), 10% may be less well known (e.g., red text words), and 5% may be unknown (e.g., green) words. Other ratios may be used in various embodiments.

To automatically retrieve text, the system may include a record (created by a student) of on-line news or other media sources, which have been identified by the student to the language-learning system as sources of text. The system may include instructions to periodically access the on-line sources and copy text from source code of currently presented web pages. The copied text may then be filtered by the system, based upon the student's current memory model data, to determine whether the copied text should, or should not, be presented to the student.

In some implementations, the language-learning system may be configured to navigate to flashcard dashboards when a user clicks on or otherwise selects color-coded text. For example, the system may navigate to a flashcard dashboard when a user clicks on a word in the translatable text of the first color, second color, or third color. In some cases, the language-learning system may automatically create new flashcards for words the student has not previously seen. In some embodiments, the language-learning system may be configured to additionally navigate to audio translations of color-coded words. For example, the system may navigate to a dashboard that displays an audio trace for the word and playback buttons when a user clicks on or otherwise selects a color-coded word. In some implementations, the language-learning system may be configured to interpret navigation to a flashcard (e.g., by clicking on a word in a study-text dashboard) as a non-recognition or incorrect translation test result and record the time of navigating to the flashcard.

Figure 4D:
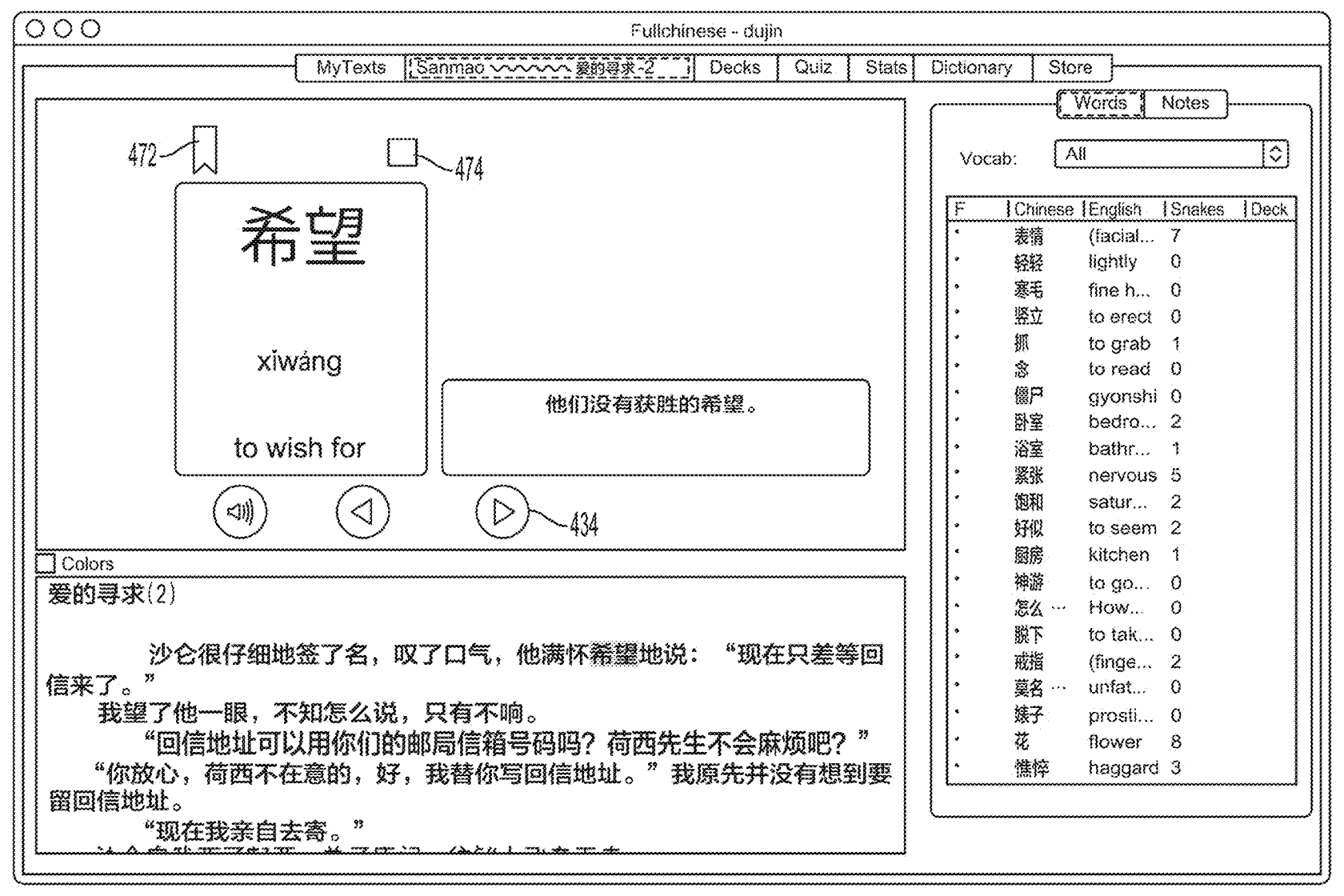

FIG. 4D depicts navigation to a flashcard dashboard within a study-text dashboard, according to some embodiments. A Chinese word "xiwang" has been clicked on by a user, which causes the display of a corresponding flashcard dashboard. The displayed flashcard includes a flag symbol 472 indicating the flashcard is being studied by the student. The displayed flashcard also includes a toggle button 474 that may be activated to toggle the displayed translation to the first language. The displayed flashcard also includes a play button 434 that may be used to play an audio recording of the word.

In some embodiments, a text dashboard 406 may include a "notes" button 409 that, when activated, causes the language-learning system to provide a "notes" window (not shown) in which a student may enter and edit notes regarding the translatable text 430. When a student is finished studying a text dashboard, the student may store and/or close the text dashboard by activating a "close" button 490.

In some instances, a student may not be able to translate text that the student enters or copies into a flashcard or text dashboard or that is presented to a student for study by an instructor or the language-learning system. An aspect of an enriched language-learning system is that study-text or flashcard data 205 may be transmitted by the language-learning system over a network 101 to an instructor, interpreter, study-mate, or coach, any of which may assist in the completion of flashcard or text translations. For example, a student may activate a "submit" button 465, providing input that causes the language-learning system to designate a flashcard or study-text for translation assistance. Flashcards and study-texts that have been submitted for translation assistance may be queued by the language-learning system, and sent in chronological order to instructors, interpreter, or others that access the language-learning system. Individuals that assist in translations may be located anywhere throughout the world and assist in the translation at any time.

In some embodiments, the enriched language-learning system may provide a fee-based translation service. For example, a student or user may submit flashcard or text data for translation as described above, and the language-learning system may provide an expected time of translation to the student. The expected time of translation may be determined by the language-learning system based upon a number of queued submissions and a rate at which queued submissions are being processed. In some embodiments, a student or user desiring a translation sooner than the estimated translation time may be able to charge a translation fee to an account for the student or user that is maintained by the language-learning system. The charging of the fee may guarantee a translation result within a pre-specified time.

Figure 5A:
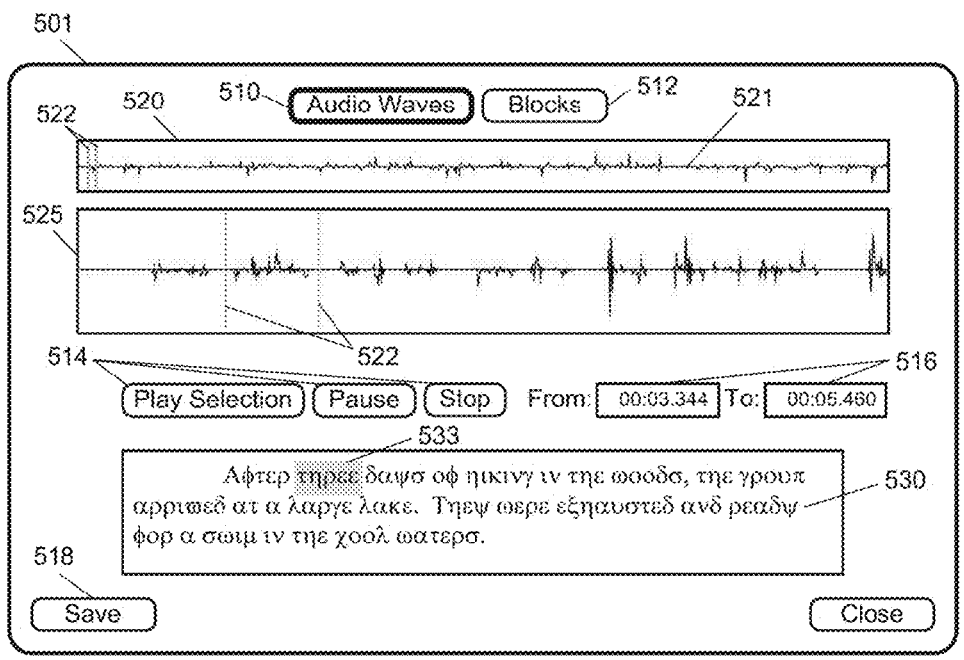
FIG. 5A and FIG. 5B depict user-interactive, editor dashboards, according to some implementations.

FIG. 5A illustrates just one example of an editor dashboard 501 that may be used by an instructor, interpreter, language coach, or a student, when editing flashcard or study-text data. An editor dashboard may be prepared by a flashcard manager 330, for example, by assembling flashcard or text data that will determine the appearance and interactive capabilities of a displayed editor dashboard 501. Flashcard or study-text data for an editor dashboard may comprise translatable items entered by a student and identified for translation assistance, and may include translations entered by a student, as well as display commands that may be interpreted by a device 130, 140 to generate a graphical rendering of the editor dashboard 501. The data may be stored by the language-learning system in association with the student. Flashcard or study-text data for an editor dashboard may further comprise audio data that may be entered by an instructor or interpreter, for example. The audio data may comprise recordings of translatable text associated with a flashcard or study-text. According to some embodiments, an editor dashboard 501 may be used by an instructor, interpreter, or student to translate translatable text 530 from a second language into a first language. The editor dashboard may also be used to record an audio translation of the translatable text, and to align the translatable text with the audio recording.

According to some embodiments, an editor dashboard may include an "audio waves" button 510 and a "blocks" button 512. The "audio waves" button, once selected, may cause the display of audio data corresponding to a verbal translation of the translatable text 530. The audio data may be displayed in one or more audio wave windows 520, 525. For example, a first audio wave window 520 may display a complete or large portion of an audio trace 521 of the translatable text 530, and a second audio wave window 525 may display a selected portion of the audio trace. The selected portion may correspond to a region of the audio recording in the vicinity of a selected text 533 that has been highlighted or otherwise selected by a user. In some implementations, demarcation bars 522 may be displayed by the language-learning system and adjusted by a user to identify a portion of the audio traces that approximately correspond to a selected text 533 in the translatable text 530. The editor dashboard 501 may also include active buttons 514 for playing a portion of the audio recording, and time indicators 516 that display time representative of a location in the audio recording at which the selected text appears.

Recording of an audio rendering of translatable text 530 and alignment of the translatable text 530 to the audio recording 521 may be accomplished in any suitable manner. For example, in a first mode of operation, an instructor or interpreter may speak the translatable text 530 and record the audio at a device 140. The language-learning system may associate the recording with a flashcard or study-text data structure for the translatable text, and produce an audio trace 521 that is displayed in the editor dashboard. According to some embodiments, an instructor or other user may then begin a process of aligning the translatable text 530 to the audio recording. For example, an interpreter may first play the audio recording, and click on or tap a word of the translatable text 530 when it has been heard while the recording is being played. Input received from the clicking or tapping may be used by the system to identify approximate locations of separations between words of the translatable text 530. The language-learning system may store alignment identifiers or time tags for these approximate locations for subsequent refinement.

In a second step, a user may then, on a word-by-word basis, click through each word of the translatable text 530. When a word of the translatable text has been selected, the demarcation bars 522 may be displayed by the language-learning system in one or both of the audio rendering windows. The user may then activate a "play selection" button 514 to confirm that the portion of the audio recording appearing between the demarcation bars corresponds to the selected word of the translatable text 533. Any errors in alignment may be corrected by dragging or otherwise moving one or both of the demarcation bars 522. Such dragging or movement of the bars may provide input to the language-learning system that is used to adjust the location of the alignment time tags or identifiers associated with the audio recording. In this manner the translatable text may be more precisely aligned with the audio transcription 521.

Figure 5B:
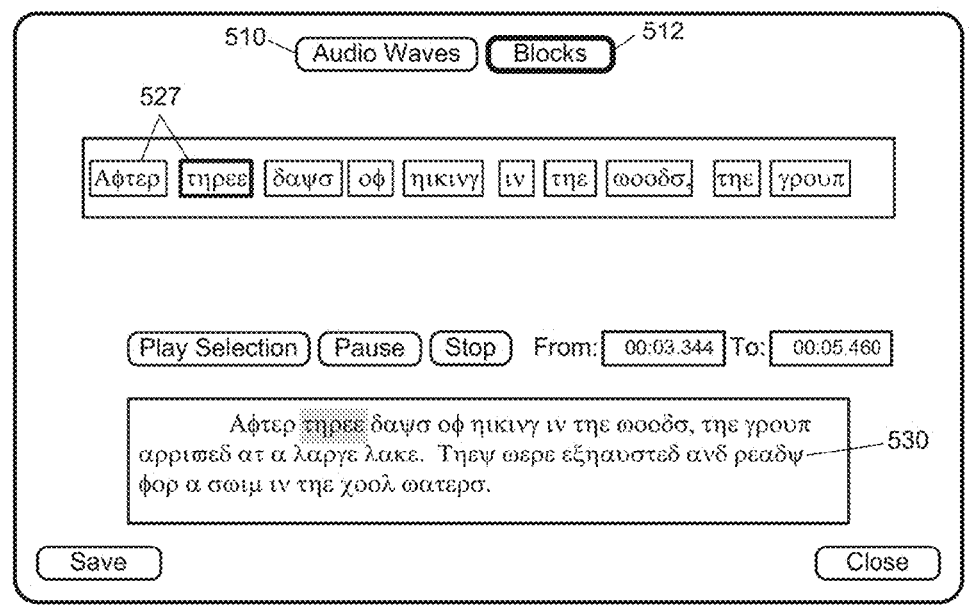

A "blocks" button of an editor dashboard 501 may, when activated by a user, cause the language-learning system to display distinct blocks of meaning of the translatable text 530, as depicted in FIG. 5B. For example, activation of the "blocks" button 512 may cause the editor dashboard to display the translatable text 530 as distinct blocks 527, as depicted in the drawing. An instructor, interpreter, or user may identify distinct blocks of meaning that may have distinct translations. The "blocks" functionality of the language-learning system may be helpful for logographic language translations, where identifying the distinct blocks of meaning may be more difficult than in alphabetic languages. According to some embodiments, an instructor may identify blocks meaning to the language-learning system by selecting (e.g., highlighting) sections of the translatable text 530.

Figure 6:
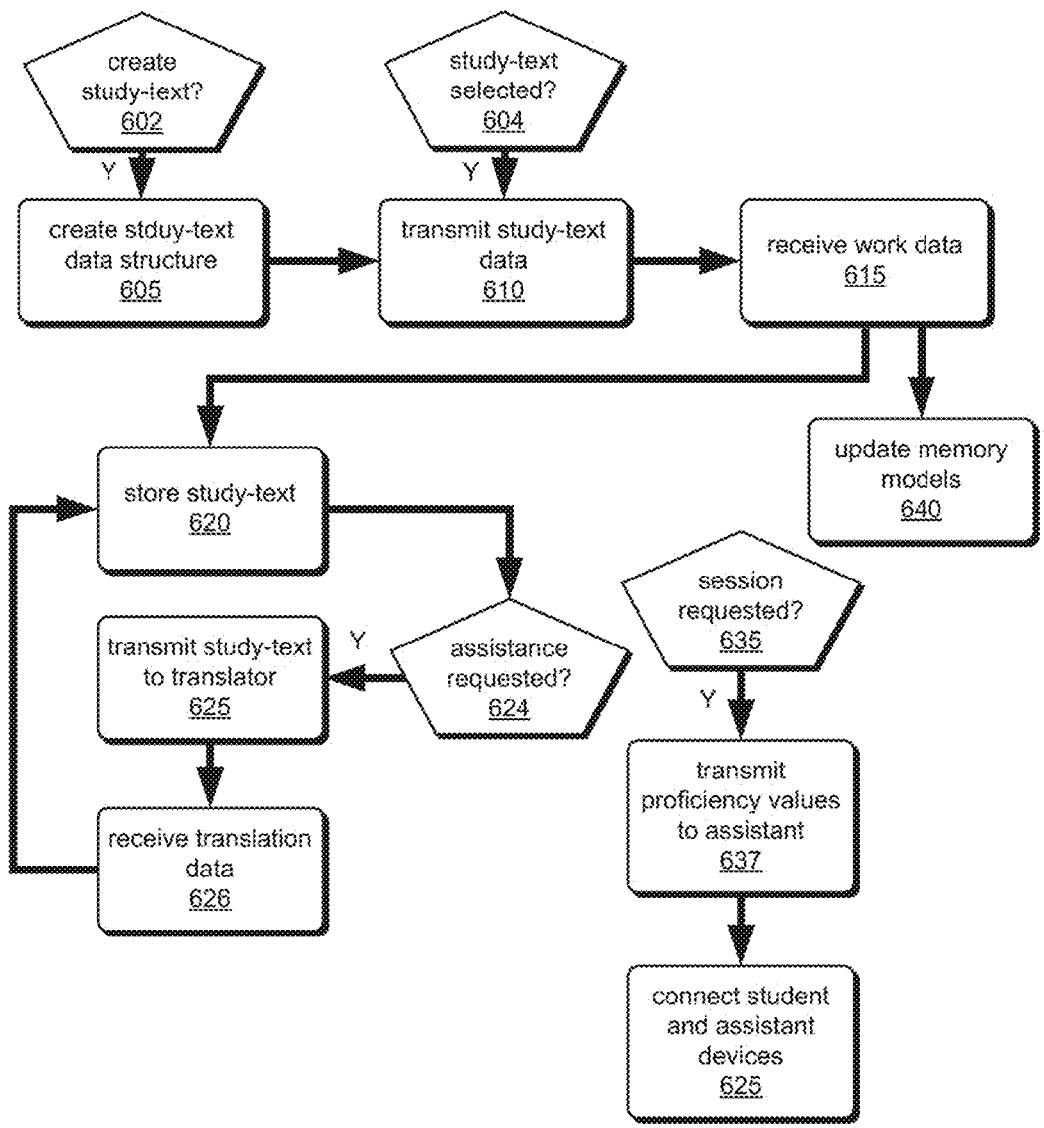
FIG. 6 illustrates acts associated with creating and using flashcard dashboards or text dashboards, according to some embodiments.

FIG. 6 depicts some acts that may be implemented during operation of an enriched language-learning tool, according to some embodiments. The acts may be implemented when a student and/or instructor works with flashcard or study-text dashboards. According to some embodiments, the learning tool may display a "create flashcard" or "create text" active button and/or await user input to create 602 or identify 604 (e.g., select from a list of flashcards or study-text) a flashcard or text data structure that a student wishes to study. If input is received to create a study-text data structure for a text dashboard, for example, the tool may assemble 605 a text data structure for a new study-text dashboard. The text data structure may include different types of data, display commands, and/or data fields for producing a text dashboard and receiving input data as depicted in FIG. 4C through FIG. 5B. The learning tool may then transmit 610 text data for displaying a text dashboard on a display of a user's device 130, 140. The language-learning tool may receive 615 work data entered into the dashboard by the user. Work data may include new translatable text that a student wishes to learn and study, translations, audio recordings, translations requests, button selections or commands, etc. According to some embodiments, a language-learning tool may receive 615 work data from a student as the student translates translatable items entered into or appearing on the dashboard.

When a student or user has finished working with a flashcard or text dashboard, a language-learning tool may receive a store command and store 620 the flashcard or study-text data for subsequent use. The language-learning tool may determine 624 if translation assistance has been requested for the flashcard or study text. If translation assistance has been requested, the tool may identify the flashcard or study-text for a translation-assistance queue, and may subsequently transmit 625 the associated data structure to an instructor or interpreter. An interpreter may work on the translatable text using an editor dashboard, and enter translation data using the dashboard. The enriched language-learning tool may then receive 626 translation data from the interpreter, and may store 620 any received translation data in association with the data structure for the particular flashcard or study-text.

As mentioned above and described in further detail below, an enriched language-learning system may include memory models for each student that uses the system. According to some embodiments, whenever a student works with a flashcard or text dashboard, the system may update 640, for example, memory representations, memory parameters, and/or proficiency values associated with one or more words or phrases and translatable aspects associated with the flashcard or text dashboard that the student works with. The memory representations can provide a highly accurate indication of the students proficiency in the second language.

At any time, a student may request 635 a tutorial session with an instructor or study-mate over a network 101. If a session has been requested, the enriched language-learning system may transmit 637 or otherwise indicate proficiency values, computed from a student's memory model, to the on-line assistant's device. According to some embodiments the language-learning system may connect 625 (e.g., facilitate communication between) the student and assistant devices. In some implementations, a sync manager 360 may coordinate display of study-text or flashcard data 201, 205 on both the student and assistant device displays, so that the student and assistant can simultaneously view a same flashcard or text dashboard for a study session. Study sessions may be requested by student at any time, for example, when working on a newly-created text dashboard or a previously-created text dashboard. Requests for study sessions may be queued by the language-learning system and serviced based on next-available assistants that are on-line. Alternatively, a study session may be requested is an informal chat session, e.g., without focusing on flashcard or text dashboards. During a chat session, a student may create flashcards.

IV. Memory Models

An important aspect of the enriched language-learning system is that it maintains and dynamically updates memory models for each student. A memory model for a student may comprise mathematical formulations and data records that can identify what a student has learned and identify a level of proficiency for each item learned with a very high level of accuracy. A student's memory models may be updated every time the student flags a flashcard for study, studies the flashcard, provides an answer to a quiz (correctly or incorrectly), or translates text having words that the student has previously studied. Based on accumulated data points, the language-learning system can track what the student has studied, and predict at which speed words, expressions, sentences, and texts may be forgotten or for how long they will be retained with a high probability of correct translation.

A student's memory model is temporally dynamic. Even though a student may not work with the language-learning system for a period of time, e.g., a week or more, proficiency values for the student may change due to the passage of time and based upon memory representations determined for the student. The language-learning system is configured to automatically track such changes and update a student's memory model, so that the model will better represent the student's comprehension level at any given time.

According to some embodiments, a student and/or the language-learning system can review data from a student's memory model to determine what translatable text should be studied by the student and at which time it should be studied. Data from a student's memory model may be provided or otherwise indicated to a teacher or study-mate by the language-learning system during on-line sessions, so that the teacher or study-mate can readily evaluate the proficiency level of the student with an unprecedented accuracy. For example, the teacher will not only know whether the student is a beginner or an advanced student, but, for any translatable item appearing before the student, the teacher will see which words and phrases the student is likely to know and the accuracy or confidence level with which the student should know those words and phrases. Further, the teacher will see which words and phrases the student does not know or has a high probability of not knowing.

Figures 7A, 7B:
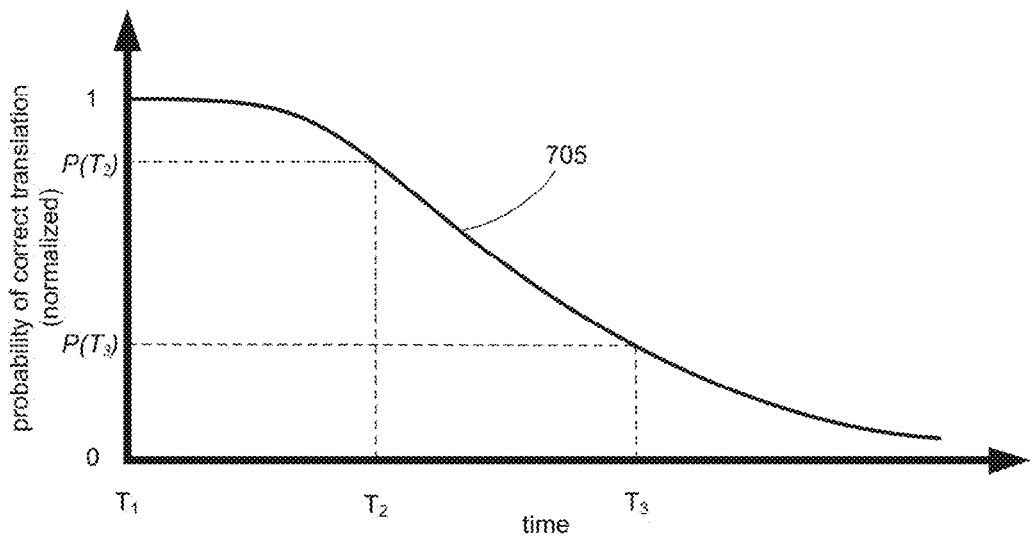
FIG. 7A depicts a memory representation, according to some embodiments.
FIG. 7B depicts a memory-model data structure, according to some embodiments.

A memory model is based on past events (e.g., past performance of a student), but is also predictive. A memory model may be used in several aspects of an enriched language-learning system (e.g., when studying flashcards, translating text, working with translatable items in an on-line session). In constructing a memory model for a student, memory representations may be formulated by the language-learning system for each word, phrase, and/or sentence that a student learns, and also for each translation aspect of the corresponding word, phrase, or sentence. Just one example of a memory representation is depicted in FIG. 7A. According to some embodiments, a memory representation comprises a mathematical construct that is representative of a student's probability of providing a correct (or incorrect) translation as a function of time, where time may be expressed in any suitable unit (e.g., seconds, hours, days, weeks, months, or years).

In various embodiments, a memory representation represents the probability of the correct translation, for a particular translation aspect provided by the student, as a function of time, and may be determined by the language-learning system from data collected (e.g., correct and incorrect translations detected at different times) while the student works with flashcard or text dashboards of the language-learning system. For example a student may learn a first word in a second language at a first time $T_1$, and at that time have a 100% chance that the student will correctly translate the word in the second language to the student's native first language. The language-learning system may determine that the student has learned a translation aspect for a newly-present word when the student correctly answers a quiz on the word for that aspect. The quiz may be presented to the student a designated time (e.g., one day) after the student first worked with a flashcard dashboard containing the new word. The language-learning system may then record a time $T_1$ (e.g., date and time) at which the translation aspect for the word has been learned, and assign an initial probability of 1 or 100% for a correct translation aspect at this time.

After passage of time, the student may begin to forget the correct translation aspect for the word, and the chance that the student will provide a correct translation diminishes as a function of time, as depicted by a memory-model curve 705 in FIG. 7A. At a later time $T_2$, the probability that the student will provide a correct translation for the particular translation aspect may be determined by the language-learning system to be $P(T_2)$. If a memory-model curve 705 is determined for the student, the language-learning system may then predict a time $T_3$ at which the student's performance $P(T_3)$ for that translation aspect (or for all aspects of a word or phrase) may fall to an unacceptably low level. According to some embodiments, the language-learning system may be programmed to automatically flag and/or provide flashcard or text dashboards to the student containing the word and translation aspect prior to the student reaching an unacceptably low level of performance. In some implementations, the language-learning system may be configured to automatically quiz the student on flagged flashcards at times that are automatically scheduled by the system, e.g., times when the confidence level of a correct translation is predicted to fall below a predetermined level.

In some embodiments, the shape of a memory-model curve 705 for a translation aspect may be predetermined or pre-set (e.g., exponential, double-exponential, piece-wise linear, logarithmic, polynomial, or a combination thereof), and one or more decay rates (e.g., 1/e value, slope, half-life, polynomial coefficient) for the student may be determined by the language-learning system. In some implementations, the language-learning system may determine decay rate values (also referred to as "memory parameters") by functional fitting, e.g., least-squares fitting. Functional fits may be based upon correct and incorrect translations detected by the language-learning system over time when the student works with flashcard and text dashboards.

According to some embodiments, the shape of a memory-model curve 705 and the decay rate value or values may be determined by the language-learning system. For example, different students may have different memory-model curves that better represent the manner in which different individuals learn, retain, and forget words and phrases in a second language. Curve shapes and memory parameters may be based upon correct and incorrect translations detected by the language-learning system when the student works with flashcard and text dashboards.

According to some embodiments, a memory representation for a translation aspect may be formulated as an exponential curve that is characterized by a half-life hl value according to the following relationship, though memory representations are not limited to only this formulation.

$$P(t) = P_0 2^{\frac{-(t-t_1)}{hl}} \tag{1}$$

In this expression, $P_0$ represents an initial probability of a correct translation (e.g., 1 or 100%) at a time $t_1$ when a student first learns a word or phrase, and t is time measured from $t_1$.

According to some embodiments, a half-life value represents an amount of time after which the probability of providing a correct translation is divided by two. For instance, if the half-life of being able to correctly translate the word "Haus" from a second language to a first language is one week, then a student's memory representation according to EQ. 1 predicts that the student will correctly translate or recognize "Haus" with a probability of 50% after one week and a probability of 25% after two weeks.

It will be appreciated that there a many ways to construct memory representations and compute associated characterizing values or memory parameters. As just one example, and continuing with the half-life memory representation described above, half-life hl values may be computed by the language-learning system based on a number of successful tests. In this example, the memory parameter hl evolves with a student's correct and incorrect answers. According to the example, the half-life value may be set by the language-learning system using the following metrics: (1) after first successful translation, set hl=3 min; (2) after one incorrect translation, reduce hl to one-quarter its current value; (3) after two successful consecutive translations, set hl=30 min; (4) after three successful consecutive translations, set hl=3 hrs; (5) after four successful consecutive translations, set hl=1 day; (6) after five successful consecutive translations, set hl=3 days; (7) after six or more successful consecutive translations, increase hl to twice its current value. The numbers and fractions here are only exemplary, and other values may be used. In some embodiments, the language-learning system is configured to present a flashcard or text dashboard to a student containing a quiz for a translation aspect based upon the half-life value (e.g., presented at times that are equal to or proportional to the half-life values).

In some embodiments, quizzes for determining half-life values or memory-model parameters may be presented over a one or two-day period, or other predetermined period of time. For example, a student's ability to answer consecutive quizzes spaced apart over a two-day period may be indicative of the student's long-term, memory-model curve 705. Therefore, long-term, memory-model parameters may be determined from quizzes presented in a compressed time period. In some embodiments, the same algorithm above may be used to maintain the student's memory representations after initially determining the student's memory-model parameters in a compressed time period. For example, in two days a student may have provided five correct consecutive translations for a word to obtain a half-life of 3 days. On a fourth day after learning the word, the language-learning system may provide the word to the student in a same or different flashcard or text dashboard, and the student correctly translates the word. Then, the half-life value for that word and translation aspect would increase to 6 days.

According to the example of calculating half-life above, the language-learning system may adapt to the student's learning curve in the following sense: if the computed half-life is too long, the half-life will quickly revert to a shorter half-life value, because the student will likely fail a quiz when presented to the student. If the half-life is too short however, the student will be able to correctly answer each successive quiz and increase the half-life value. This can be a beneficial feature of a half-life memory representation as described above; it can quickly correct when overestimating a student's capability. Further, the cost of retesting a well-known translation aspect is low, because the student may only spend a few seconds on each test, increase the half-life value relatively quickly, and increase the student's confidence. Also, the half-life memory representation and corresponding timed quizzes can avoid longer times associated with relearning a translation aspect for a word or phrase (nearly from scratch) when the word or phrase has not been studied or seen for a long period of time (e.g., a period significantly longer than the student's half-life value for that translation aspect). Accordingly, an enriched language-learning system can tailor a student's study schedule to increase time between well-known translatable items to longer and longer time intervals. For example, when the half-life for a translation aspect of a translatable item reaches a couple of months, the system may quiz the student on that aspect a couple of times a year (e.g., one to six times per year). In this manner, the language-learning system can administer quizzes in an efficient manner, when needed, anticipating a natural forgetfulness of the student.

Another algorithm that may be used by a language-learning system for computing half-life values may be based on time intervals between consecutive successful tests. For example, an algorithm may be as follows: (1) following a first correct translation, set hl=15 min; (2) following an incorrect translation, reduce hl to one-quarter its current value; (3) after two consecutive correct translations, set hl to the greater value of $1.5 \times (t_{n+1} - t_n)$ or the previous half-live value where $(t_{n+1} - t_n)$ represents the time between the two consecutive tests. In this method, the value of 1.5 is used for explanation, and other values may be used in other embodiments. This method of computing half-life values may better track the student's natural memory characteristics, since the half-life value is proportional to a time span over which the student has correctly answered two consecutive quizzes.

In some implementations, statistical and/or averaging methods across different words and phrases may be used to determine memory-model parameters. For example, a student's responses s(u) may be recorded by the language-learning system as follows.

$$s(u) = \{(f_1, a_1, \delta_1, s_1)_i, (f_2, a_2, \delta_2, s_2)_{i+1}, \ldots (f_n, a_n, \delta_n, s_n)_{i+n}\} \quad (2)$$

In this expression, $f_n$ represents an identifier for a translatable item (word, phrase, or sentence, for example) associated with a flashcard, $a_n$ represents a translation aspect for the word, phrase, or sentence, $\delta_n$ represents a time interval between consecutive tests for the word, phrase, or sentence, and $s_n$ may be a Boolean value representing a correct or incorrect translation for the $i^{th}$ test. From this data set, all data corresponding to a particular translation aspect may be grouped together and analyzed for the student. The resulting data set may be represented by the following expression.

$$s(u, a_2) = \{(f_2, \delta_2, s_2)_{i+1}, \ldots (f_n, \delta_n, s_n)_{i+n}\}_{a_n = a_2} \quad (3)$$

The resulting data may be analyzed by the language-learning system using any suitable method to determine a half-life value for the translatable aspect. For example, the data may be analyzed to determine a time interval value $\delta_n$ after which the number of incorrect translations exceeds the number of correct translations. This value may then be taken as a half-life value for the student for that translation aspect.

In some implementations, the language-learning system may not average across different translatable items, and may analyze data associated with a particular word, for example.

$$s(u, f_2, a_2) = \{(\delta_2, s_2)_{i+1}, \ldots (\delta_n, s_n)_{i+n}\}_{a_n = a_2, f_n = f_2} \quad (4)$$

The collected data may be analyzed for the particular word and translatable aspect as described above, e.g., determining a time interval value $\delta_n$ after which the number of incorrect translations exceeds the number of correct translations. Other statistical methods may be used for determining a half-life value or memory-model parameter, as described below.

Other statistical methods of computing and maintaining memory representations and memory-model parameters may be used additionally or alternatively to the methods described above. In some embodiments, a memory representation and memory parameters may be refined over time, and may be based upon a history of a student's responses to flashcard quizzes and/or work on translatable text. For example, the language-learning system may maintain a data record of correct and incorrect translations for each translation aspect which a student has studied. This record may contain all student responses s(u) described above. In some embodiments, the results may be analyzed for a particular translation aspect and/or translatable item, e.g., binned into different time intervals between consecutive tests and processed to generate a histogram showing a percentage of correct responses recorded for each bin. This histogram may then indicate a probability of a correct response as a function of time intervals between consecutive tests. As more data is collected on a student, a language-learning system may switch from an initial memory representation, such as a half-life model using any of the algorithms described above, to a statistical model that is based on accumulated data for the student over the student's lifetime of use of the system, such as the histogram model. The statistical model may be continuously updated with new data. For a histogram model, a student's probability of providing a correct translation may be a current value computed for the histogram for a time interval since the student was last tested on the translatable item and translation aspect.

The time $T_1$ at which a student first learns a translation aspect of a new word in a second language may be determined in the following manner. For example, the language-learning system may present a new word to a student at a time $T_0$ and subsequently test the student on that word for a translatable aspect at one or more subsequent times. According to some embodiments, an enriched language-learning system may record the time $T_1$ as a time at which the student first provides a correct translation of the translatable aspect for a test administered after $T_0$. Other methods may be used to determine the time $T_1$. In some embodiments, an enriched language-learning system may record the time $T_1$ as a time at which the student first provides a second, consecutive correct translation of the translatable aspect for a test administered after $T_0$. According to some implementations, a second test may be spaced from a first test by a predetermined amount of time, e.g., a time between about one hour and two days.

Once determined, a time $T_1$ may be recorded in a memory-model data structure for the student and associated with a corresponding translatable item and translation aspect. According to some embodiments, an enriched language-learning system may not change the value of $T_1$ after it has been recorded. However, some implementations enriched language-learning system may alter the value of $T_1$ if the system determines that the student has substantially forgotten the translatable item. For example, if the student fails a number of consecutive tests of a translation aspect and/or fails tests for all translation aspects of a translatable item. In some implementations, an enriched language-learning system may set a threshold representing a level of proficiency below which $T_1$ is reset. When $T_1$ is reset, T1 may be advanced to a next time at which the student provides a correct response for translation aspect for a translatable item responsive to a quiz.

When $T_1$ for a translation aspect of a word, for example, has been determined a student, the language-learning system may accumulate additional data for the word, for the translation aspect, and for that student. Each additional piece of data may be used to update a memory representation and/or memory-model parameter for that translation aspect. Additional data may be accumulated for other translation aspects associated with the word. According to some embodiments, the language-learning system may record each subsequent test time and test result for each translation aspect of the word. All data relating to a student's memory model may be stored in one or more memory-model data structures that are managed by an enriched language-learning system.

FIG. 7B depicts just one example of a memory-model data structure 702 that may be maintained by an enriched language-learning system to represent a memory model for a student. According to some embodiments, a memory-model data structure may include a student identification value 710 that associates a particular student with the memory model data recorded for that student. The data structure may include a listing of translatable items or translatable item identifiers 720-1, 720-2, 720-*n*. Each item 720 may correspond to a word, phrase, sentence, etc. in the second language. For example, a translatable item may be a text representation in some embodiments. In some embodiments, a translatable item may be a pointer or other linking identifier that identifies an entry in a dictionary or language data store 310.

Associated with each item 720 may be one or more translation aspects 721. For example a first translation aspect 721-11 may comprise writing a correct translation of the word or phrase in the student's first language after seeing the word or phrase in the second language. A second translation aspect 721-12 comprise hearing the word in the second language and writing or typing the word into the students first language. For each translation aspect, the system may record a time $T_1$ 722-*nn* at which it has been determined that the student first knows the correct translation, as described above. A memory-model data structure 702 may, or may not, further include a record of test times 723-*nn* and test results 724-*nn* identifying when the student has been tested for a particular translation aspect and a corresponding test result. A memory-model data structure may also include memory-model values 725-*nn* characterizing a memory representation curve 705. Model values 725 may include memory-model parameters, data identifying a memory representation type and/or functional form, and may include proficiency values. There may be one or more memory-model values stored in association with each translation aspect.

A memory-model data structure 702 may be constantly updated as a student uses the language-learning system, so that memory representations for the student are dynamically updated. Data for the memory-model data structure may be collected by an enriched language-learning system at various times when a student works with translatable text and need not be limited to flashcard quizzes. For example, a student may copy text into a newly-created flashcard or text dashboard, and may begin translating the copied text. The language-learning system may identify which words and phrases in the copied text have been previously studied by the student and which words and phrases are new to the student. In some embodiments, the language-learning system may automatically generate and flag new flashcards for new words and phrases of the copied text. For words and phrases that have been previously studied by the student, the language-learning system may detect whether the student enters a correct or incorrect translation while translating the text. Detected correct and incorrect translations may be recorded in the memory-model data structure and/or used to update memory-model parameters. According to some embodiments, the student's interactions with an enriched language-learning system "trains" the student's memory model.

In some embodiments, at least some values stored for T1722-*nn*, test times 723-*nn*, and test results 724-*nn* may, or may not, be overwritten as new results are recorded in the memory-model data structure. In some implementations, all data is added to a student's record without overwriting or erasure of earlier-recorded data. Additionally, model values 725-*nn* may be continuously updated as new data are accumulated.

When a student requests and on-line session with an instructor or a study-mate, the language-learning system may compile and/or process data from the memory-model data structure 702 and transmit a report to the instructor or study-mate, so that the instructor or study-mate can rapidly evaluate the proficiency of the student for various words, phrases, sentences and translation aspects. In this manner an instructor or on-line assistant can quickly gauge the level of proficiency of the student, and readily tailor the on-line session to the student. For example, an instructor, after selecting translatable text for a student to review during an on-line session, may immediately see how much of the text the student knows and does not know and/or receive a score indicating a level of difficulty of the text for the student. In some embodiments, the language-learning system may transmit computed probabilities, based upon the student's memory representations, for a correct translation for each word in the text. In some implementations, the language-learning system may transmit a score that is an average of the computed probabilities of correct answers for each word.

Figure 8:
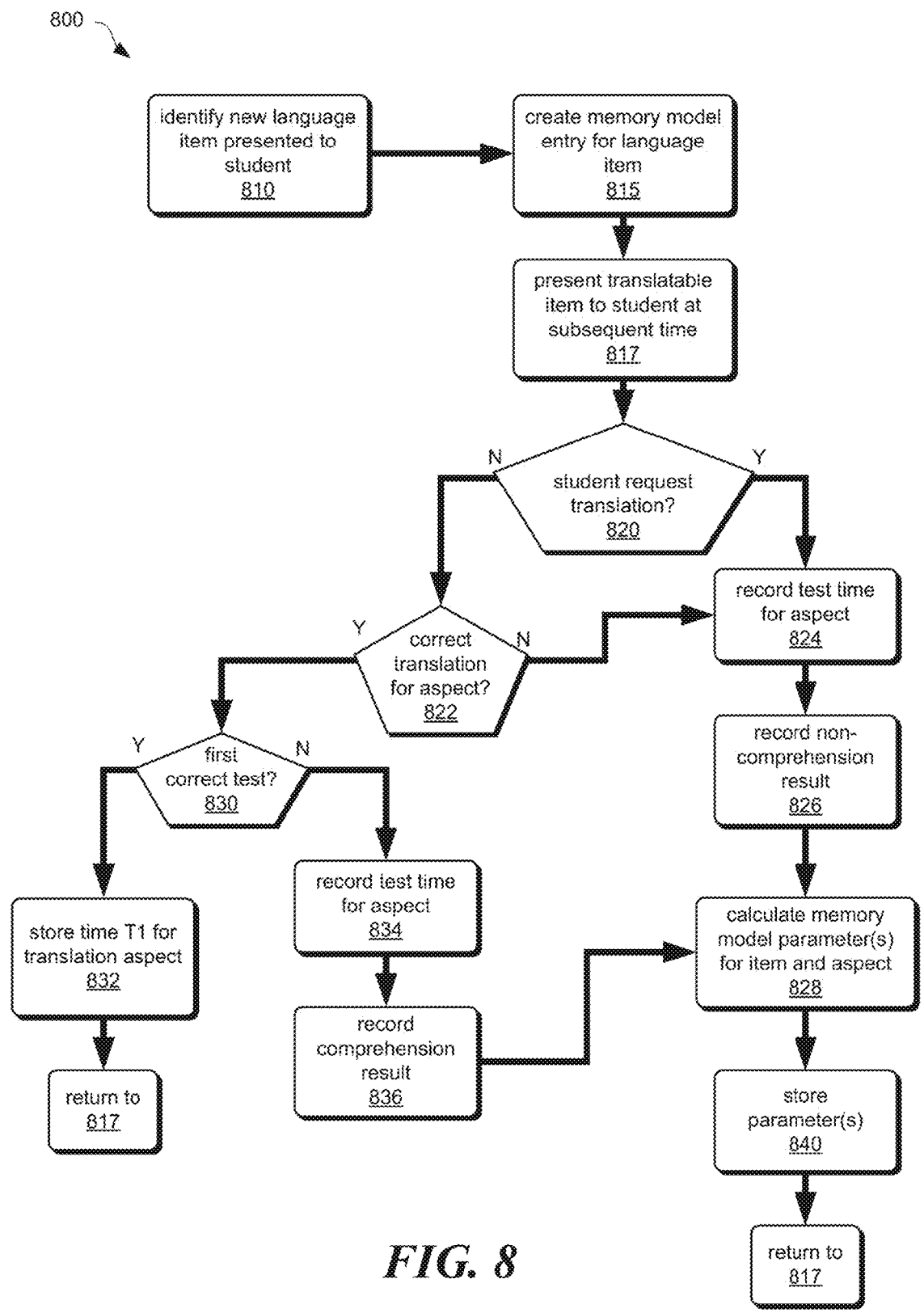
FIG. 8 illustrates acts associated with maintaining a memory model for a student, according to some embodiments.

FIG. 8 depicts just one embodiment of a method 800 that may be used to create and manage memory representations for a student in an enriched language-learning system. Such a method may be used to update a student's memory model. Alternative embodiments may include more or fewer acts, and may be arranged in a different order. According to some embodiments, the system may identify 810 a translatable item and translation aspect that is newly presented to the student. The new translatable item may be a word or a phrase, for example, in a second language. Responsive to identifying a new translatable item, the system may create 815 a memory-model entry for the new translatable item. The memory-model entry may include data fields (e.g., T1 fields, test time fields, test result fields, model value fields, etc.) for each translation aspect of the new translatable item, as depicted in FIG. 7B.

After the initial presentation of the new translatable item to the student, the language-learning system may present 817 the item to the student at a subsequent time. The subsequent presentation may be in the form of a flashcard quiz, or may be translatable text or audio where the translatable item is included in a plurality of words of the text or audio. Upon seeing or hearing the translatable item, the student may or may not request 820 a translation for the item. In some embodiments, a request may comprise revealing a hidden translation on a flashcard dashboard. In some implementations, a request may comprise consulting a dictionary translation of the item.

If the student does not request a translation for the translatable item, the system may determine 822 whether the student provides a correct translation. If the student provides a correct translation, the language-learning system may determine 830 whether the provided translation is a first correct translation by the student for that translation aspect. If it is determined 830 that the correct translation corresponds to a first successful test, the system may store 832 a time $T_1$ that identifies a time at which the student has first learned the translation aspect for the translatable item. The system may then return to a step of presenting 817 the translatable item to the student at different times.

If the language-learning system determines 830 that the result of the test is not a first test of the translatable item for the student, and determines that the student has provided a correct translation for a translation aspect of the translatable item, then the system may record 834 the test time and further record 836 a positive comprehension result for the translation aspect and item for the student. The system may then calculate 828 one or more memory-model parameters for the translatable item and translation aspect based upon the correct response. The system may then store 840 the one or more parameters in the student's memory-model data record 702 in a personal comprehension data store 350-1. The system may then return to a step of presenting 817 a translatable item to the student.

In some embodiments, if the language-learning system determines 822 that a student provides an incorrect translation for a translatable item, the system may record 824 a test time for the incorrect response and translation aspect, and further record a non-comprehension result 826 for the translation aspect. The language-learning system may then calculate 828 one or more memory-model parameters for the translatable item and translation aspect based upon the incorrect response, and store 840 the updated parameters in the student's personal comprehension data store. The system may then return to a step of presenting 817 translatable items to the student.

There may be several methods by which an enriched language-learning system detects correct and incorrect translations for translation aspects of translatable items. In some embodiments, the system may determine 822 a correct or incorrect translation based upon text that is entered by the student in response to a flashcard quiz. In some embodiments, a correct or incorrect translation may be detected based upon speech input by the student in response to a flashcard quiz. For example a language-learning system may use speech-recognition technology or audio data comparison to detect correct or incorrect verbal utterances from a student.

In some implementations, correct and incorrect responses may be detected when a student works on translating text presented in a newly-created flashcard or text dashboard. For example, a text dashboard containing translatable text may be presented to the student. In some embodiments, a student may select or highlight one or more words in the translatable text that the student does not know. For example, the words may be highlighted for translation assistance. The language-learning system may detect the words highlighted by the student and determine whether one or more of the highlighted words were previously studied by the student. If a highlighted word has been studied by the student, the system may determine that the act of highlighting the word by the student is a recognition error. The system may then record a time and non-comprehension result in the student's memory-model data record and/or update the memory-model parameters. Additionally, words that have not been highlighted by the student and that have previously studied by the student may be detected by the language-learning system as correct recognition by the student. Accordingly, positive comprehension results and test times for these words may be stored in the student's memory-model data record and/or the memory-model parameters may be updated. In some embodiments, a student may activate a dictionary button 460 to interpret one or more words appearing in a flashcard or text dashboard. The language-learning system may detect the activation of the dictionary button 460 and determine whether the word has been previously studied by the student. If the word has previously been studied by the student, the system may interpret the activation of the dictionary as a recognition error, and update the student's memory-model data record accordingly. By one or more of these methods, an enriched language-learning system may accumulate statistics and/or update memory representations and memory parameters of words and phrases and corresponding translation aspects that a student knows and does not know as the student interacts with the system.

Because an enriched language-learning system develops detailed memory-model records for a student, the language-learning system can provide a helpful amount of statistics and/or statistical summaries for the benefit of a student and/or instructor. FIG. 9 is one example of a flashcard summary dashboard 902 that may be provided to a student and/or instructor or other on-line assistant. A flashcard summary dashboard 902 may include display data and a compilation of statistical data and/or computations of student proficiency values developed from the student's memory-model data record that is transmitted to a student's and/or instructor's device 130, 140 for display. According to some embodiments, a flashcard summary dashboard may include a list of words 930 in the second language (Chinese in the illustrated example) that are included in flashcards studied by the student and that may or may not have been flagged by the student as being important to the student. According to some embodiments, when a flashcard is studied by a student, a flag value may be set by the system to a first value in the flashcard's data structure to indicate that the flashcard is important to the student. A flashcard summary may identify flagged flashcards in a list of flag values 920. For example, an asterisk, value of 1, or other character may identify important flashcards. A statistical summary 902 may also include pronunciations 940 and translations 950 for flashcard words.

The statistical data included with a flashcard summary may comprise a list of times 960 when each translatable item on the list was last viewed or studied by the student. In some implementations, the statistical summary may also include a compiled or aggregate score 980 for each translatable item. In some embodiments, a breakdown of scores for each translatable aspect may be included. An aggregate score may be based upon a compilation of different translation aspect scores for each translatable item. For example an aggregate score 980 may comprise an average value of probabilities of correct translations for each translation aspect of a translatable item.

A flashcard summary dashboard 902 may also include active buttons for selecting how the information shall be displayed. For example, a flashcard summary 902 may include a "flashcard" button 905 that selects for display in the summary only words from flashcards that contain a single translatable word. A second's "snakes" button 907 may be included to display words that appear in, or identifiers for, phrases, sentences, or paragraphs, or passages of flashcards containing multiple words of translatable text. A flashcard summary dashboard may also include active buttons for displaying an order in which the results are listed in the summary. For example, a set of sorting buttons 910 may be included to sort the listings by words that were recently tested or recently added to the student's personal language data store 320-1. In some embodiments, the listings may be sorted by how well, or how poorly, the student recalls translations for the listed item. This sorting may be based on computed current probabilities that the student will provide correct translations for the translatable items.

The language-learning system may also provide study-text summary dashboards for study-text. A study-text summary dashboard may be similar to the flashcard summary dashboard 902, but contain data relevant to the study-text. In some implementations, a flashcard summary dashboard may also include data summaries for study-text.

As discussed above, flashcards and study-text may be arranged into decks by a student, and stored accordingly by the language-learning system. In various embodiments, a student may group a number of flashcards and study-text together into a deck that the student wishes to identify by subject matter. For example, a student may wish to group together such words as "door," "window," "stairs," "wall," "fireplace," "chimney," "sink," "bathroom," etc. into a deck title "house." According to some embodiments, a student may create a deck, e.g., by activating a "new" or "new deck" button 422 on a flashcard and entering a title for the deck. A student may then associate a plurality of flashcards and study-texts with the deck by drag-and-drop or click operations or by identifying a flashcard or study-text title in association with the deck title. The language-learning system may store one or more identifiers (e.g., store identifiers in a student's personal language data record 702) for each translatable item that links a translatable item and its associated flashcard and/or study-text with one or more decks.

Figure 10:
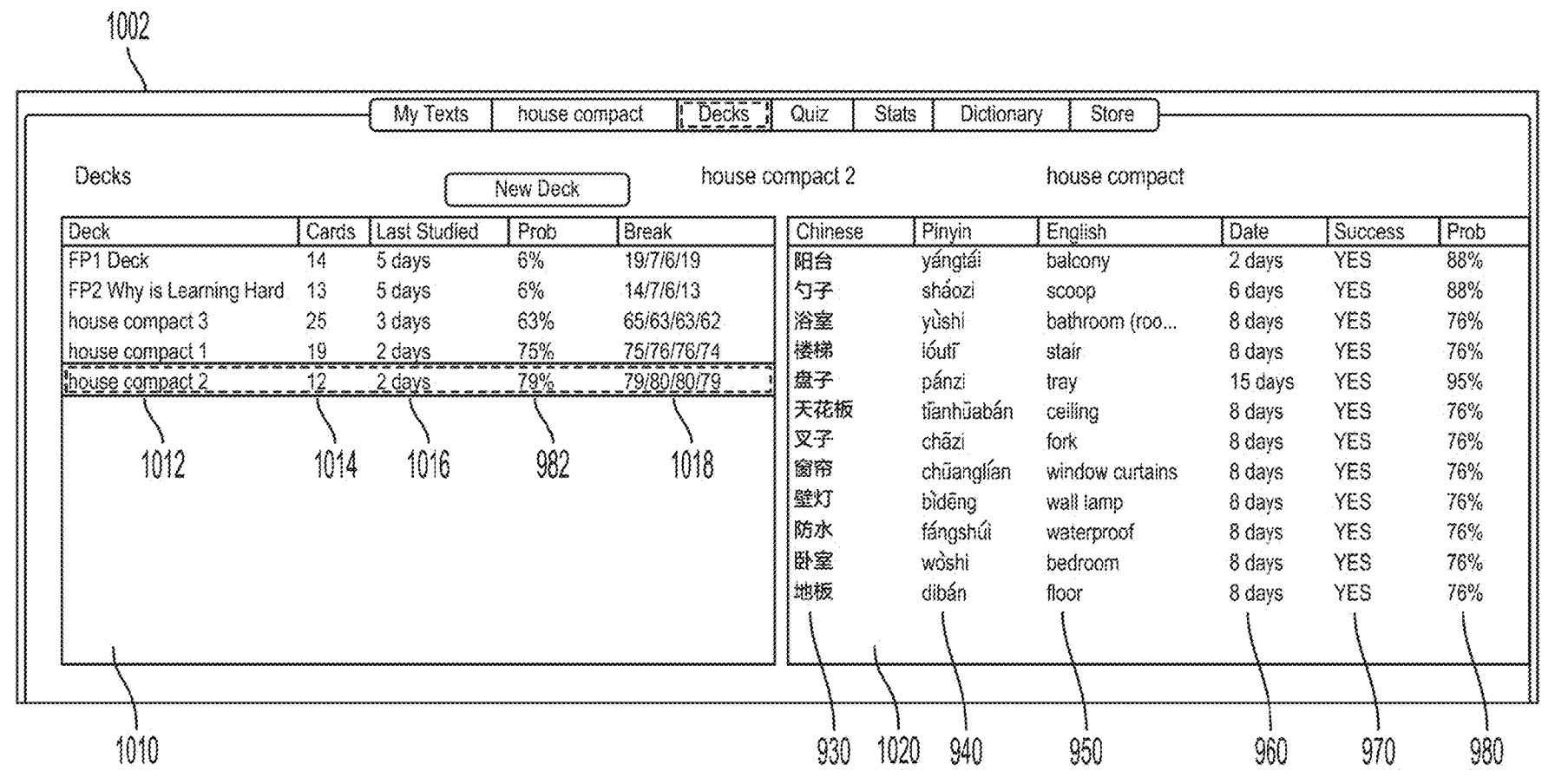

In some embodiments, a language-learning system may include statistical summary data for decks of flashcards and/or study texts, as depicted in FIG. 10. A deck summary dashboard 1002 may include a first window 1010 that displays a listing of decks 1012 studied by a student, and a second window 1020 that includes information and statistical data about translatable items for each flashcard or study-text. According to some embodiments the first window 1010 may include a list of the number of flashcards and study-texts 1014 that are included in each deck, and a time 1016 at which the deck was last studied. In some embodiments, a list of aggregate scores 982 representative of the student's proficiency for the deck may be included in the deck summary 1002. In some embodiments, an aggregate score for a deck may comprise an average score of the student's probabilities of correct translations for all translation aspects and all translatable items within the deck.

In some implementations, a statistical summary (in either a flashcard summary, study-text summary, or deck summary) may include a breakdown of a student's different probabilities of correct translations for each translation aspect. In some cases, the breakdown of a student's probabilities may be averaged within each translation aspect over all translatable items in a deck and included in a deck statistical summary 1002, as depicted in FIG. 10. A breakdown of a student's probabilities for different translation aspects can provide a more details view of a student's comprehension of words, phrases, sentences, or translatable items associated with a flashcard, study-text, or deck. For example and referring to FIG. 10, a deck titled "house compact 2" has a probabilities breakdown score of 79/80/80/79. This score may be used to represent that a student has a 79% chance of correctly translating a typed word in the deck from the second language into the student's first language, an 80% chance of correctly writing a word from the first language in the deck into a second language, an 80% chance that the student will correctly transcribe a word in the deck heard in the second language into the first language, and a 79% chance that the student will correctly verbally translate a word in the deck from the first language to the second language.

In various embodiments, a flashcard summary dashboard 902 and/or deck summary dashboard 1002 (or data therefrom) may be shared with an instructor or on-line assistant during an on-line session. It may be appreciated that an instructor may view the statistical data quickly to identify words and study text or decks that the student knows well and does not know, so that the study session may be more focused to aid the student in areas where the student can improve their comprehension. Accordingly, even brief on-line sessions can be tailored quickly and become more efficient uses of time for instructing a student.

V. Statistical Compilations

As described above, an enriched language-learning system can store an appreciable amount of detailed information in a student's memory model, and can provide an appreciable amount of statistical data from which to evaluate a student's proficiency in a second language. For example, a language-learning may record the history of learning of any translatable item and associated translation aspects for a student. The system may store additional student-related information. For example, it may record information about when flashcards, decks, and study-texts are studied, progress made on translating text (e.g., percent completion), and practicing deck quizzes. Data that may be included in a student's data record may include: identifiers (titles) for text, flashcards, and/or decks studied, time last studied, bookmarks indicating where the student stopped working, identifiers (flag values) indicating whether a translatable item or items in a flashcard, study-text, or deck has been marked by the student as being important to the student, record of access to a dictionary, personal notes entered by a student for a translatable item, one or more tags identifying a subject matter.

Because the level of detail of information that may be presented to a user could be overwhelming or distracting on a visual display to a user, statistical data may be compiled according to some embodiments, though also available in detail upon request. One method for compiling statistical data is according to the following expression.

$$P(u, f_i) = \frac{1}{N} \sum_{n=1}^{N} P(u, f_i, a_n) \quad (5)$$

In EQ. 5, $P(u, f_i)$ represents a combined probability for a student of correctly translating any translation aspect $a_n$ for a particular translatable item $f_i$. In some embodiments, a combined probability may be weighted according to the following relation.

$$P(u, f_i) = \frac{1}{N} \sum_{n=1}^{N} \alpha_n P(u, f_i, a_n) \quad (6)$$

where $\alpha_n$ represents a weighting value for a translation aspect $a_n$ and $\Sigma \alpha_n = 1$. The weighting values $\alpha_n$ may be preset by a system developer, in some embodiments. As one non-limiting example, the following weighting values may be set in an enriched language-learning system: $\alpha_{rc}=0.25$ for correct visual recognition and translation of a translatable item presented to the student in the second language, $\alpha_{pc}=0.20$ for correctly writing the item in the second language when seeing or hearing it in the first language, $\alpha_{rs}=0.25$ for correct audio recognition of the item presented in the second language, $\alpha_{ps}=0.25$ for correctly speaking the item in the second language when seeing or hearing it in the first language, and $\alpha_{kp}=0.05$ for correctly providing a phonetic transcription of the item presented in the second language. Other weighting values may be used in other embodiments. For example, weighting values for a student who is deaf may be $\alpha_{rc}=0.35$, $\alpha_{pc}=0.35$, $\alpha_{rs}=0$, $\alpha_{ps}=0.2$, $\alpha_{kp}=0.1$.

VI. First Language Improvement and Specific Vocabulary Development

Although the enriched language-learning system is described above for studying a second language, the system may also be used to improve an individual's vocabulary and language capabilities in a user's first language. For example, a user may desire to increase his or her vocabulary in his or her first language. The user may create flashcards or study-texts with words previously unknown to the user for subsequent study. A flashcard may include a single word, a sentence, a phrase, etc. and its translation. A first-language memory-model data record may be maintained by the enriched language-learning system for the individual according to the methods described above. Additionally, the language-learning system may quiz the individual on newly learned vocabulary items according to the methods described above.

In some embodiments, an individual may copy examples of text or sentences into a flashcard or study-text for study. This may be done to improve an individual's speaking style. Also, an individual may connect, through the language-learning system, to on-line language coaches that may be recognized masters at speaking in the first language.

It may be appreciated that the enriched language-learning system may also be useful for developing specific vocabularies by individuals. For example, a medical student may use the language-learning system to develop a vocabulary specific to an area of medical practice.

When used for a user's first language, each item of vocabulary may have only one two translation aspects: (1) providing a correct definition when seeing or hearing the item, and (2) providing the item when seeing or hearing the corresponding definition. Accordingly, a memory-model data structure for first-language usage may be simplified compared to the structure depicted in FIG. 7B. Additionally, statistical data collection, presentation, and computations may be simplified.

VII. Conclusion

Having thus described several aspects of at least one embodiment of an enriched language-learning system, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, and modifications, as will be appreciated by those of skill in the art.

While various inventive embodiments have been described and illustrated, those of ordinary skill in the art will readily envision a variety of other means and/or structures for performing the function and/or obtaining the results and/or one or more of the advantages described, and each of such variations and/or modifications is deemed to be within the scope of the inventive embodiments described. More generally, those skilled in the art will readily appreciate that all parameters and configurations described are meant to be exemplary and that the actual parameters and/or configurations will depend upon the specific application or applications for which the inventive teachings is/are used. Those skilled in the art will recognize, or be able to ascertain using no more than routine experimentation, many alternatives to the specific inventive embodiments described. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure may be directed to each individual feature, system, system upgrade, and/or method described. In addition, any combination of two or more such features, systems, and/or methods, if such features, systems, system upgrade, and/or methods are not mutually inconsistent, is included within the inventive scope of the present disclosure.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used are for organizational purposes only and are not to be construed as limiting the subject matter described in any way.

In connection with machine-implemented functionality, the above-described embodiments of the invention can be implemented in any of numerous ways. For example, some embodiments may be implemented using hardware, software, firmware, or a combination thereof. When any aspect of an embodiment is implemented at least in part in software, the software code can be executed on any suitable processor or collection of processors, whether provided in a single computer or distributed among multiple computers. The software, when executed, may specifically adapt the processor or collection of processors to perform the functionality according to one or more of the above described embodiments.

In this respect, various aspects of the invention, e.g., an enriched language-learning server 120, an application manager 305, a flashcard manager 330, a memory-model manager 340, and a sync manager 360 may be embodied and/or implemented at least in part as machine-readable medium (e.g., a computer memory, one or more floppy discs, compact discs, optical discs, magnetic tapes, flash memories) or other tangible computer storage medium or non-transitory medium) encoded with one or more programs that, when executed on one or more computers or other processor(s), perform acts of the one or more methods as described above. In some embodiments, one or more of these components of an enriched language-learning system may be implemented, at least in part, as circuit configurations in Field Programmable Gate Arrays (FPGAs) or other semiconductor devices. As is apparent from the foregoing examples, a computer-readable storage medium may retain information for a sufficient time in a non-transitory form to provide computer-executable instructions. The machine-readable medium may be transportable, such that the program or programs stored thereon can be loaded onto one or more different computers or other processors to implement various aspects of the present technology as discussed above.

Machine-readable instructions may be in any one or combination of several forms, such as program modules, executed by one or more computers or other devices. Generally, program modules may include routines, programs, objects, components, linked libraries, data structures, etc. that perform particular tasks or implement particular data types. Typically the functionality of the program modules may be combined or distributed as desired in various embodiments.

Also, data structures may be stored in machine-readable media in any suitable form. For simplicity of illustration, data structures may be shown to have fields that are related through location in the data structure. Such relationships may likewise be achieved by assigning storage for the fields with locations in a machine-readable medium that conveys relationship between the fields. However, any suitable mechanism may be used to establish a relationship between information in fields of a data structure, including through the use of pointers, tags or other mechanisms that establish relationship between data elements.

Machine-readable instructions may be executable on one or more processors that employ any one of a variety of operating systems or platforms. Additionally, such instructions may be written using any of a number of suitable programming languages and/or programming or scripting tools, and also may be compiled as executable machine language code or intermediate code that is executed on a framework or virtual machine.

Data processors may be implemented as integrated circuits, with one or more processors in an integrated circuit component, including commercially-available integrated circuit components known in the art by names such as CPU chips, GPU chips, microprocessor, microcontroller, or co-processor. Alternatively, a data processor may be implemented in custom circuitry, such as an ASIC, or semicustom circuitry resulting from configuring a programmable logic device. As yet a further alternative, a processor may be a portion of a larger circuit or semiconductor device, whether commercially-available, semi-custom, or custom-built. As a specific example, some commercially-available microprocessors have multiple cores such that one or a subset of those cores may constitute a data processor suitable for implementing functionality described above. Though, a processor may be implemented using logic circuitry in any suitable format.

A data-processing device may be embodied in any of a number of forms, such as a rack-mounted computer, a desktop computer, a laptop computer, or a tablet computer. Additionally, a data-processing device may comprise embedded data-processing circuitry in a device not generally regarded as a computer but with suitable processing capabilities, including a Personal Digital Assistant (PDA), a smart phone, a smart watch, or any other suitable portable or fixed electronic device.

The terms "program" or "software" may be used to refer to computer code or set of computer-executable instructions that can be employed to program a computer or other processor to implement various aspects of the present technology as discussed above. Additionally, it should be appreciated that according to one aspect of this embodiment, one or more computer programs that, when executed, perform methods of the present technology and need not reside on a single computer or processor, but may be distributed in a modular fashion amongst a number of different computers or processors to implement various aspects of the present technology.

The term "associated with," when used in connection with data structures, may be used to describe a combination of data structures in some embodiments. For example, first data associated with second data may mean adding the first data to a data record containing the second data, or vice versa. "Associated with" may mean establishing a relational data structure between first and second data in some embodiments. For example, first data may be entered in a table or augmented with an identifier that cross-references or links the first data to second data, even though the first and second data may be stored in different data stores.

Where user-interactive displays are described, active text or buttons may alter their appearance when selected or clicked on by a user. For example, active text or buttons may change color or be highlighted in any suitable manner when selected, so as to indicate that the text or button has been selected. The term "active button" may be used to refer to active text.

In some cases, functionality of the system may be described from the perspective of a user acting upon the system. For such descriptions, it will be understood that the system includes the necessary code and hardware that would provide a display for accepting user input, receive and process the input, and execute corresponding functionality responsive to the user input.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

The terms "about," "approximately," and "substantially" may be used to refer to a value, and are intended to encompass the referenced value plus and minus variations that would be insubstantial. The amount of variation could be less than 5% in some embodiments, less than 10% in some embodiments, and yet less than 20% in some embodiments. In embodiments where an apparatus may function properly over a large range of values, e.g., one or more orders of magnitude, the amount of variation could be a factor of two. For example, if an apparatus functions properly for a value ranging from 20 to 350, "approximately 80" may encompass values between 40 and 160.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An apparatus comprising:
a display;
memory;
a user input device; and
at least one processor connected to the display, memory, and user input device, wherein the at least one processor is configured to:
determine, by the at least one processor based on past input received from a user via the user input device over a plurality of different times, a future time at which the user's likelihood of correctly translating a first item from a first language to a second language falls below a first threshold value;
identify the first item from among a plurality of first translatable items stored in the memory; and
present, at a second time based on the future time, a challenge on the display that causes the user to recall a translation of the identified first item from the first language to the second language, wherein the at least one processor is further configured to code text corresponding to the first item differently from text for a plurality of second translatable items when the at least one processor determines that the user's likelihood of correctly translating the first item from the first language to the second language falls below a second threshold value, so that the first item will be displayed differently from the plurality of second translatable items on the display.

2. The apparatus of claim 1, wherein the at least one processor is further configured to code text corresponding to a new translatable item not previously presented to the user differently from text for the plurality of second translatable items, so that the new translatable item will be displayed differently from the plurality of second translatable items on the display.

3. The apparatus of claim 1, wherein the at least one processor is further configured to:
construct a data table in the memory for third translatable items that have been translated by the user;
maintain, in the data table, a dynamic parameter for each third translatable item, wherein the dynamic parameter indicates a time dependence of the user's likelihood of correctly translating a corresponding third translatable item from the first language to the second language; and
update one or more of the dynamic parameters repeatedly over time based on user input for the corresponding third translatable items.

4. The apparatus of claim 1, wherein the at least one processor is further configured to:
construct, in the memory, data fields in a data table for the first item and the plurality of second translatable items; and
determine, from the data table, the future time at which the user's likelihood of correctly translating the first item from the first language to the second language falls below the threshold value.

5. The apparatus of claim 4, wherein the at least one processor is further configured to:
receive translatable text from an on-line source;
determine a level of translation difficulty of the translatable text for the user based upon data in the data table; and
if the level of translation difficulty is below a predetermined threshold value, encode the translatable text for display to the user such that the coding visually indicates on the display how well each word in the translatable text will be correctly recognized by the user; or
if the level of difficulty is above a predetermined threshold value, do not provide the translatable text for display.

6. The apparatus of claim 5, wherein determining a level of difficulty comprises evaluating likelihoods of the user correctly translating a plurality of translatable items appearing in the translatable text.

7. The apparatus of claim 1, wherein the apparatus comprises a smart phone or personal electronic device.

8. An apparatus comprising:
a display;
memory;
a user input device; and
at least one processor connected to the display, memory, and user input device, wherein the at least one processor is configured to:
determine, by the at least one processor based on past input received from a user via the user input device over a plurality of different times, a future time at which the user's likelihood of correctly translating a first item from a first language to a second language falls below a first threshold value;
identify the first item from among a plurality of first translatable items stored in the memory; and
present, at a second time based on the future time, a challenge on the display that causes the user to recall a translation of the identified first item from the first language to the second language, wherein the at least one processor is further configured to code text corresponding to a new translatable item not previously presented to the user differently from text for the plurality of second translatable items, so that the new translatable item will be displayed differently from the plurality of second translatable items on the display.

9. The apparatus of claim 8, wherein the at least one processor is further configured to:
construct a data table in the memory for third translatable items that have been translated by the user;
maintain, in the data table, a dynamic parameter for each third translatable item, wherein the dynamic parameter indicates a time dependence of the user's likelihood of correctly translating a corresponding third translatable item from the first language to the second language; and
update one or more of the dynamic parameters repeatedly over time based on user input for the corresponding third translatable items.

10. The apparatus of claim 8, wherein the at least one processor is further configured to:
construct, in the memory, data fields in a data table for the first item and the plurality of second translatable items; and
determine, from the data table, the future time at which the user's likelihood of correctly translating the first item from the first language to the second language falls below the threshold value.

11. The apparatus of claim 10, wherein the at least one processor is further configured to:
receive translatable text from an on-line source;
determine a level of translation difficulty of the translatable text for the user based upon data in the data table; and
if the level of translation difficulty is below a predetermined threshold value, encode the translatable text for display to the user such that the coding visually indicates on the display how well each word in the translatable text will be correctly recognized by the user; or if the level of difficulty is above a predetermined threshold value, do not provide the translatable text for display.

12. The apparatus of claim 11, wherein determining a level of difficulty comprises evaluating likelihoods of the user correctly translating a plurality of translatable items appearing in the translatable text.

13. The apparatus of claim 8, wherein the apparatus comprises a smart phone or personal electronic device.

14. A server comprising:
  memory storing a plurality of first translatable items in a first language, corresponding translations in a second language, and machine-readable instructions; and
  at least one processor connected to the memory, wherein the at least one processor, when executing the machine-readable instructions, is configured to:
    identify a first item from among the plurality of first translatable items stored in the memory;
    determine, by the at least one processor based on past input received from a user input device over a plurality of different times, a future time at which a user's likelihood of correctly translating the first item from a first language to a second language falls below a first threshold value;
    output, at a second time based on the future time, instructions that cause a display on the user input device to display a challenge on the display that causes the user to recall a translation of the identified first item from the first language to the second language; and
    code text corresponding to the first item differently from text for a plurality of second translatable items when the at least one processor determines that the user's likelihood of correctly translating the first item from the first language to the second language falls below a second threshold value, so that the first item will be displayed differently from the plurality of second translatable items on the display.

15. The server of claim 14, wherein the at least one processor is further configured to code text corresponding to a new translatable item not previously presented to the user differently from text for the plurality of second translatable items, so that the new translatable item will be displayed differently from the plurality of second translatable items on the display.

16. The server of claim 14, wherein the at least one processor is further configured to:
  construct a data table in the memory for third translatable items that have been translated by the user;
  maintain, in the data table, a dynamic parameter for each third translatable item, wherein the dynamic parameter indicates a time dependence of the user's likelihood of correctly translating a corresponding third translatable item from the first language to the second language; and
  update one or more of the dynamic parameters repeatedly over time based on user input for the corresponding third translatable items.

17. The server of claim 14, wherein the at least one processor is further configured to:
  receive translatable text from an on-line source;
  determine a level of translation difficulty of the translatable text for the user based upon data in the data table; and
  if the level of translation difficulty is below a predetermined threshold value, encode the translatable text for display to the user such that the coding visually indicates on the display how well each word in the translatable text will be correctly recognized by the user; or
  if the level of difficulty is above a predetermined threshold value, do not provide the translatable text for display.

18. The server of claim 17, wherein determining a level of difficulty comprises evaluating likelihoods of the user correctly translating a plurality of translatable items appearing in the translatable text.

19. The server of claim 14, wherein the apparatus comprises a smart phone or personal electronic device.

20. The server of claim 14 in combination with the display.

* * * * *